US011050992B2

(12) United States Patent
Sato

(10) Patent No.: US 11,050,992 B2
(45) Date of Patent: Jun. 29, 2021

(54) CONTROL APPARATUS, IMAGE PROCESSING SYSTEM, CONTROL METHOD, AND MEDIUM

(71) Applicant: CANON KABUSHIKI KAISHA, Tokyo (JP)

(72) Inventor: Tomokazu Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/797,552

(22) Filed: Feb. 21, 2020

(65) Prior Publication Data

US 2020/0280708 A1 Sep. 3, 2020

(30) Foreign Application Priority Data

Mar. 1, 2019 (JP) ............................ JP2019-037771

(51) Int. Cl.

*H04N 13/117* (2018.01)
*H04N 13/194* (2018.01)
*H04N 13/167* (2018.01)
*H04N 13/282* (2018.01)
*H04N 1/327* (2006.01)

(52) U.S. Cl.

CPC ......... *H04N 13/117* (2018.05); *H04N 1/3275* (2013.01); *H04N 13/167* (2018.05); *H04N 13/194* (2018.05); *H04N 13/282* (2018.05)

(58) Field of Classification Search

CPC .. H04N 1/3275; H04N 13/194; H04N 13/167; H04N 13/282
USPC ............................................................ 348/48
See application file for complete search history.

(56) References Cited

U.S. PATENT DOCUMENTS 9,578,279 B1 * 2/2017 Mysore Vijaya Kumar ................ H04N 21/23418
2003/0169627 A1 * 9/2003 Liu ........................ H04N 19/61 365/200
2012/0081508 A1 * 4/2012 Kitazato ................ G06T 7/557 348/48
2015/0245013 A1 * 8/2015 Venkataraman ........ G06T 7/557 348/48
2016/0042242 A1 * 2/2016 Segawa ................ H04N 13/128 382/103
2016/0309084 A1 * 10/2016 Venkataraman ... H04N 9/04515
2017/0148186 A1 * 5/2017 Holzer ................... H04N 5/265
2017/0148199 A1 * 5/2017 Holzer .................. G06T 3/4038
2017/0270683 A1 * 9/2017 Sakamoto ................ G06T 7/74

(Continued)

FOREIGN PATENT DOCUMENTS

JP 2013098739 A 5/2013
JP WO 2018/021067 * 2/2018 .......... H04N 13/117

*Primary Examiner* — Marnie A Matt
(74) *Attorney, Agent, or Firm* — Rossi, Kimms & McDowell LLP

(57) ABSTRACT

There is provided with a control apparatus of an image processing system. The image processing system has a plurality of image capturing apparatuses that capture images of an object from different viewpoints. An obtaining unit obtains a position of the object. A setting unit sets, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses.

16 Claims, 13 Drawing Sheets

(56) References Cited

U.S. PATENT DOCUMENTS

| | | | | |
|---|---|---|---|---|
| 2018/0137366 | A1* | 5/2018 | Szeto | G06K 9/00744 |
| 2019/0158802 | A1* | 5/2019 | Higuchi | H04N 13/117 |
| 2019/0238819 | A1* | 8/2019 | Furukawa | G06T 15/205 |
| 2019/0311526 | A1* | 10/2019 | Sugio | H04N 13/117 |

* cited by examiner

100
IMAGE PROCESSING SYSTEM
110a
110b
110c
110z
SENSOR SYSTEM
111a
111b
111c
111z
MICROPHONE
114a
114b
114c
114z
EXTERNAL SENSOR
112a
112b
112c
112z
CAMERA
120a
120b
120c
120z
CAMERA ADAPTOR
113a
113b
113c
113z
PLATFORM
170a
170b
170c
170y
291
HUB
180
180a
310c
310b
310a
300
FRONTEND SERVER
230
DATABASE (DB)
250
BACKEND SERVER
270
200
CONTROL STATION
310
UI
330
CONTROLLER
TIME SERVER
290
SERVER
TERMINAL
190

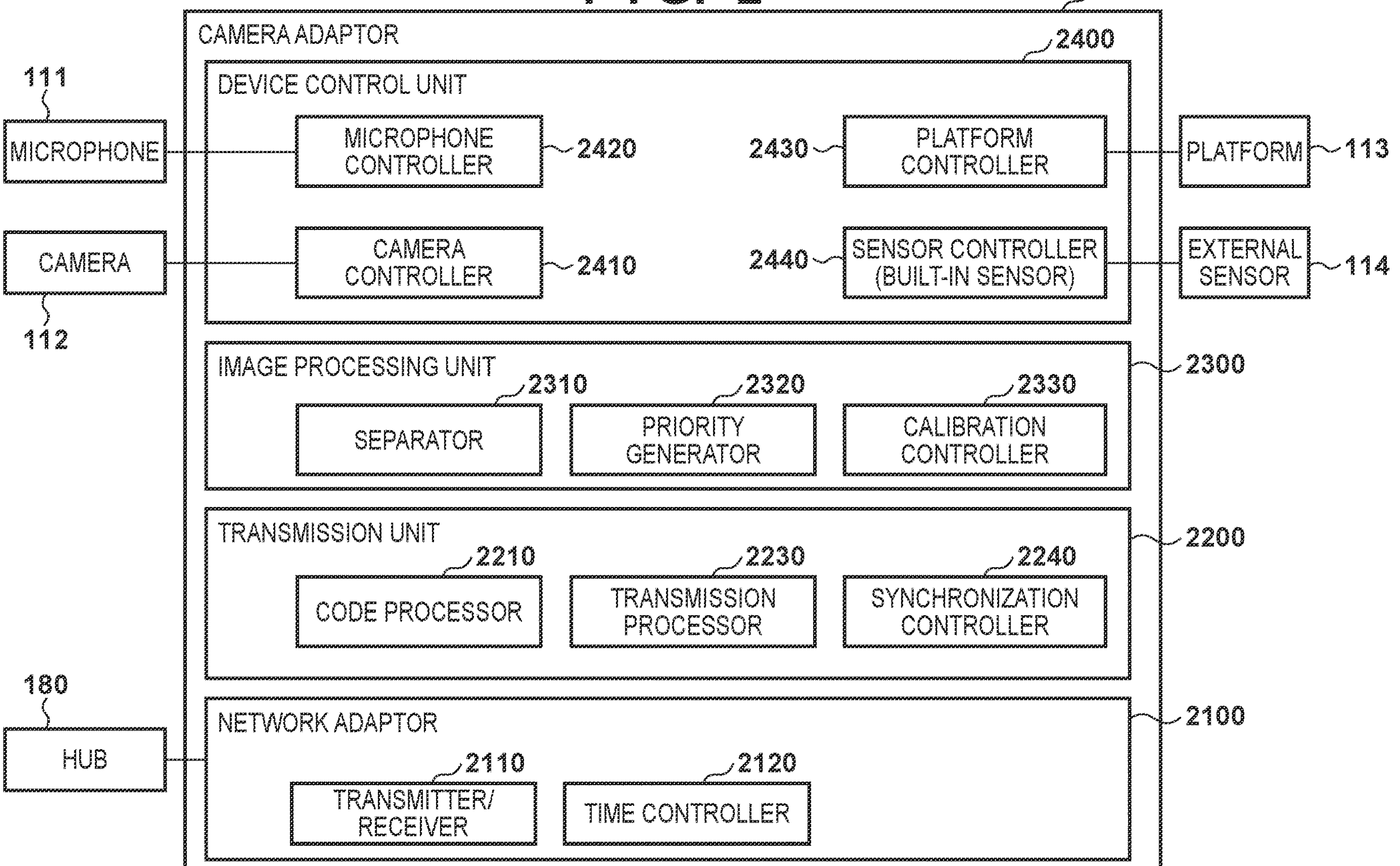
FIG. 2
120
CAMERA ADAPTOR
2400
DEVICE CONTROL UNIT
111
MICROPHONE
MICROPHONE CONTROLLER
2420
2430
PLATFORM CONTROLLER
PLATFORM
113
CAMERA
112
CAMERA CONTROLLER
2410
2440
SENSOR CONTROLLER (BUILT-IN SENSOR)
EXTERNAL SENSOR
114
IMAGE PROCESSING UNIT
2300
2310
SEPARATOR
2320
PRIORITY GENERATOR
2330
CALIBRATION CONTROLLER
TRANSMISSION UNIT
2200
2210
CODE PROCESSOR
2230
TRANSMISSION PROCESSOR
2240
SYNCHRONIZATION CONTROLLER
180
HUB
NETWORK ADAPTOR
2100
2110
TRANSMITTER/ RECEIVER
2120
TIME CONTROLLER 2300
IMAGE PROCESSING UNIT
2320
PRIORITY GENERATOR
CAMERA PARAMETER RECEIVER
2321
2322
2324
POSITION OBTAINER
PRIORITY CALCULATOR
PRIORITY
OFFSET
2310
2410
2330
2311
SEPARATOR
CAMERA CONTROLLER
CALIBRATION CONTROLLER
FOREGROUND SEPARATOR
FOREGROUND IMAGE
2312
2314
COMPARATIVE IMAGE
BACKGROUND CUTTER
BACKGROUND IMAGE
2313
COMPARATIVE IMAGE UPDATER
2200
TRANSMISSION UNIT

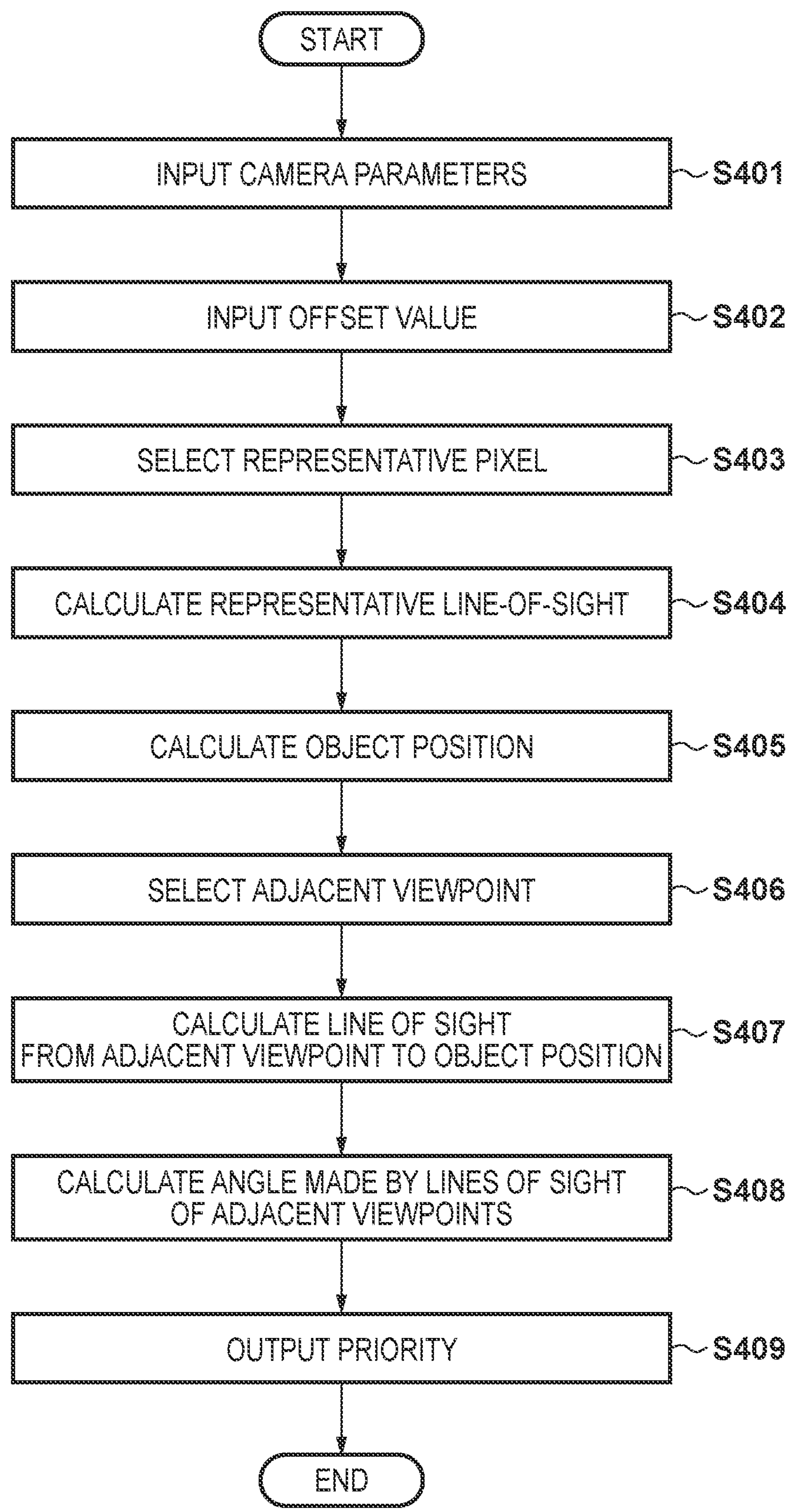
F I G. 4
START
INPUT CAMERA PARAMETERS
S401
INPUT OFFSET VALUE
S402
SELECT REPRESENTATIVE PIXEL
S403
CALCULATE REPRESENTATIVE LINE-OF-SIGHT
S404
CALCULATE OBJECT POSITION
S405
SELECT ADJACENT VIEWPOINT
S406
CALCULATE LINE OF SIGHT FROM ADJACENT VIEWPOINT TO OBJECT POSITION
S407
CALCULATE ANGLE MADE BY LINES OF SIGHT OF ADJACENT VIEWPOINTS
S408
OUTPUT PRIORITY
S409
END

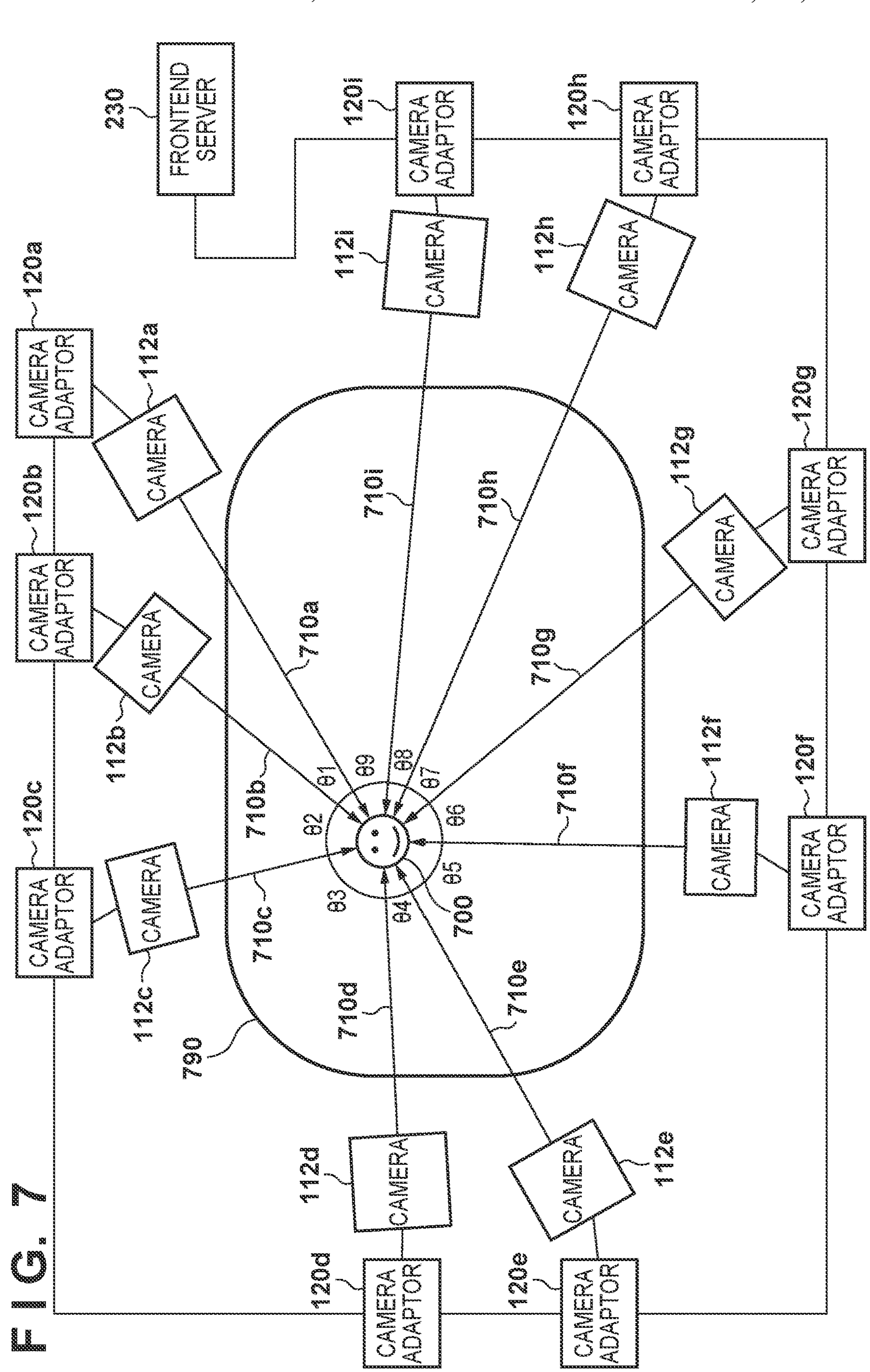
F I G. 7
230
FRONTEND SERVER
120a
120b
120c
120d
120e
120f
120g
120h
120i
CAMERA ADAPTOR
CAMERA
112a
112b
112c
112d
112e
112f
112g
112h
112i
710a
710b
710c
710d
710e
710f
710g
710h
710i
θ1
θ2
θ3
θ4
θ5
θ6
θ7
θ8
θ9
700
790

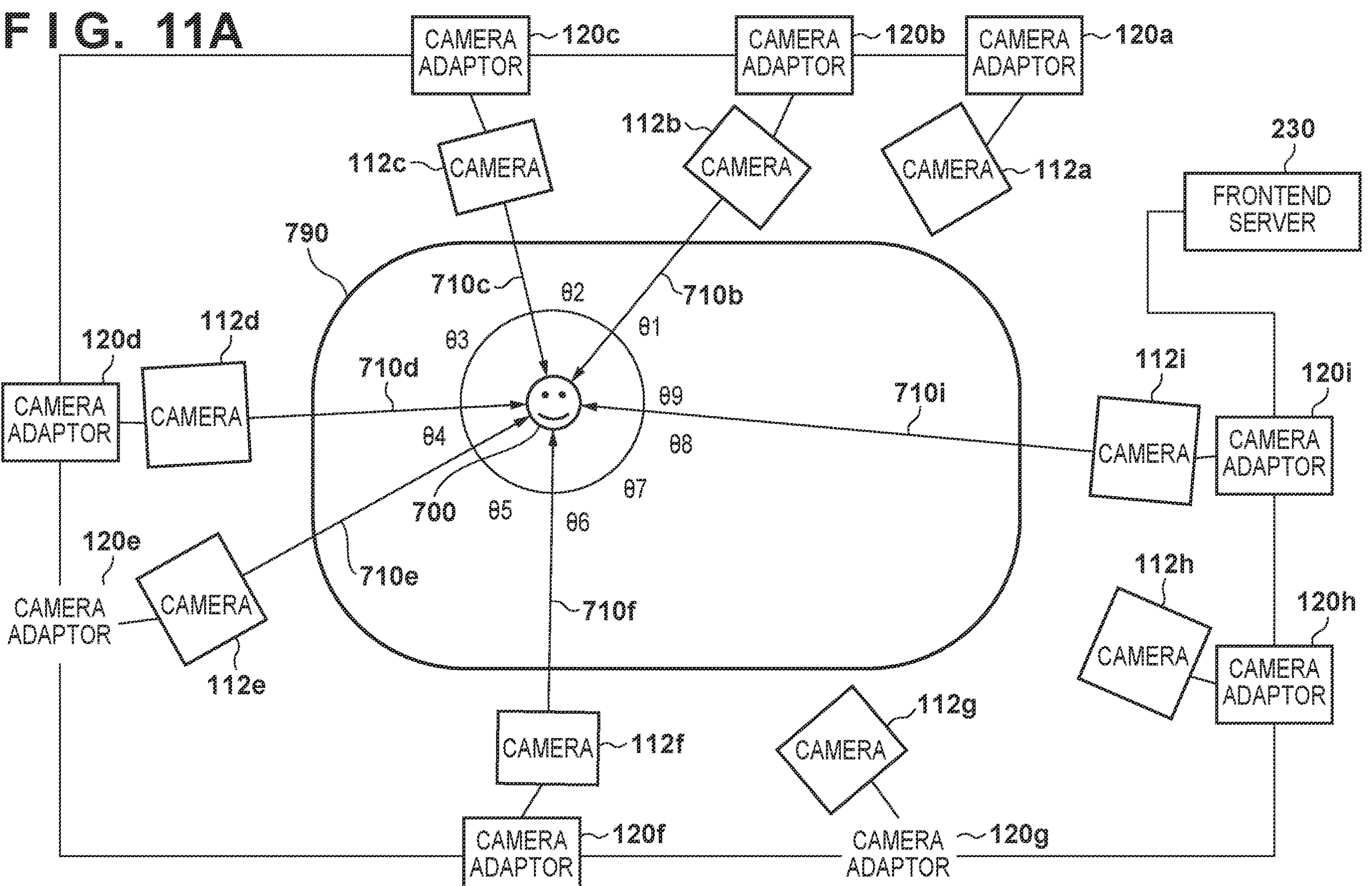
F I G. 11A
CAMERA ADAPTOR
120c
120b
120a
112b
112c
112a
CAMERA
230
FRONTEND SERVER
790
710c
710b
θ2
θ1
θ3
120d
112d
710d
112i
120i
710i
θ9
θ4
θ8
θ7
700
θ5
θ6
120e
710e
710f
112h
120h
112e
112f
112g
120f
120g 230
FRONTEND SERVER
120a
120b
120c
120d
120e
120f
120g
120h
120i
CAMERA ADAPTOR
112a
112b
112c
112d
112e
112f
112g
112h
112i
CAMERA
710b
710c
710d
710e
710f
710g
700
790
θ1
θ2
θ3
θ4
θ5
θ6
θ7
θ8
θ9

START
CALCULATE LINES-OF-SIGHT
S1201
CALCULATE PRIORITY FOR EACH VIEWPOINT
S1202
S1203
IS PRIORITY OF SELF-VIEWPOINT THE LOWEST?
NO
YES
S1205
S1204
OUTPUT PRIORITY OF SELF-VIEWPOINT
EXCLUDE LOWEST-PRIORITY VIEWPOINT
END

1201
CPU
1202
ROM
1203
RAM
1204
AUXILIARY STORAGE DEVICE
DISPLAY UNIT
1205
OPERATION UNIT
1206
COMMUNICATION UNIT
1207
1208
CAMERA ADAPTOR
120

230
FRONTEND SERVER
120a
120b
120c
120d
120e
120f
120g
120h
120i
CAMERA ADAPTOR
112a
112b
112c
112d
112e
112f
112g
112h
112i
CAMERA
790
1
2
3
4
5
6
7
8
9
11
12
13
14
15
16
17
18
19
20
21
22
23
24
25
26
27
28

CONTROL APPARATUS, IMAGE PROCESSING SYSTEM, CONTROL METHOD, AND MEDIUM

BACKGROUND OF THE INVENTION

Field of the Invention

The present invention relates to a control apparatus, an image processing system, a control method, and a medium, in particular to a system that captures an image of an object by using a plurality of image capturing apparatuses.

Description of the Related Art

A multicamera system in which a plurality of image capturing apparatuses are installed in different positions and capture images of an object from different viewpoints is known. Also, a technique that generates a virtual viewpoint content by using a plurality of images from multiple viewpoints obtained by synchronously performing image capturing at a plurality of viewpoints is attracting attention. This technique allows a user to view sports scenes and the like from various positions (virtual viewpoints), thereby improving the presence that the user experiences.

In the system that performs image capturing at a plurality of positions, an image data amount to be generated in the whole system increases in accordance with the number of image capturing units. Japanese Patent Laid-Open No. 2013-98739 discloses a method by which, in order to reduce the data amount in a multi-lens camera including a plurality of image capturing units, images captured by selected image capturing units are thinned in accordance with whether the shooting mode is a near view shooting mode or a distant view shooting mode.

SUMMARY OF THE INVENTION

According to an embodiment of the present invention, a control apparatus of an image processing system which comprises a plurality of image capturing apparatuses that capture images of an object from different viewpoints comprises: an obtaining unit configured to obtain a position of the object; and a setting unit configured to set, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses.

According to another embodiment of the present invention, an image processing system comprises a plurality of image capturing systems that are connected to each other and configured to capture images of an object from different viewpoints, wherein a second image capturing system which is at least one of the plurality of image capturing systems is configured to receive a captured image by a first image capturing system which is one of the plurality of image capturing systems, and to control transmission of a captured image by the second image capturing system and the captured image by the first image capturing system based on a position of the object.

According to still another embodiment of the present invention, a control method of an image processing system which comprises a plurality of image capturing apparatuses that capture images of an object from different viewpoints comprises: obtaining a position of the object; and setting, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses.

According to yet another embodiment of the present invention, a non-transitory computer-readable medium stores a program which, when executed by a computer comprising a processor and a memory, causes the computer to perform a control method of an image processing system which comprises a plurality of image capturing apparatuses that capture images of an object from different viewpoints, the control method comprising: obtaining a position of the object; and setting, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses.

Further features of the present invention will become apparent from the following description of exemplary embodiments (with reference to the attached drawings).

BRIEF DESCRIPTION OF THE DRAWINGS

FIG. 2 is a block diagram showing a functional configuration example of a camera adaptor 120;

FIG. 4 is a flowchart showing an example of a priority calculation process;

FIG. 7 is a view for explaining a priority calculation method;

FIGS. 11A and 11B are views for explaining a priority calculation method;

DESCRIPTION OF THE EMBODIMENTS

Figure 1:
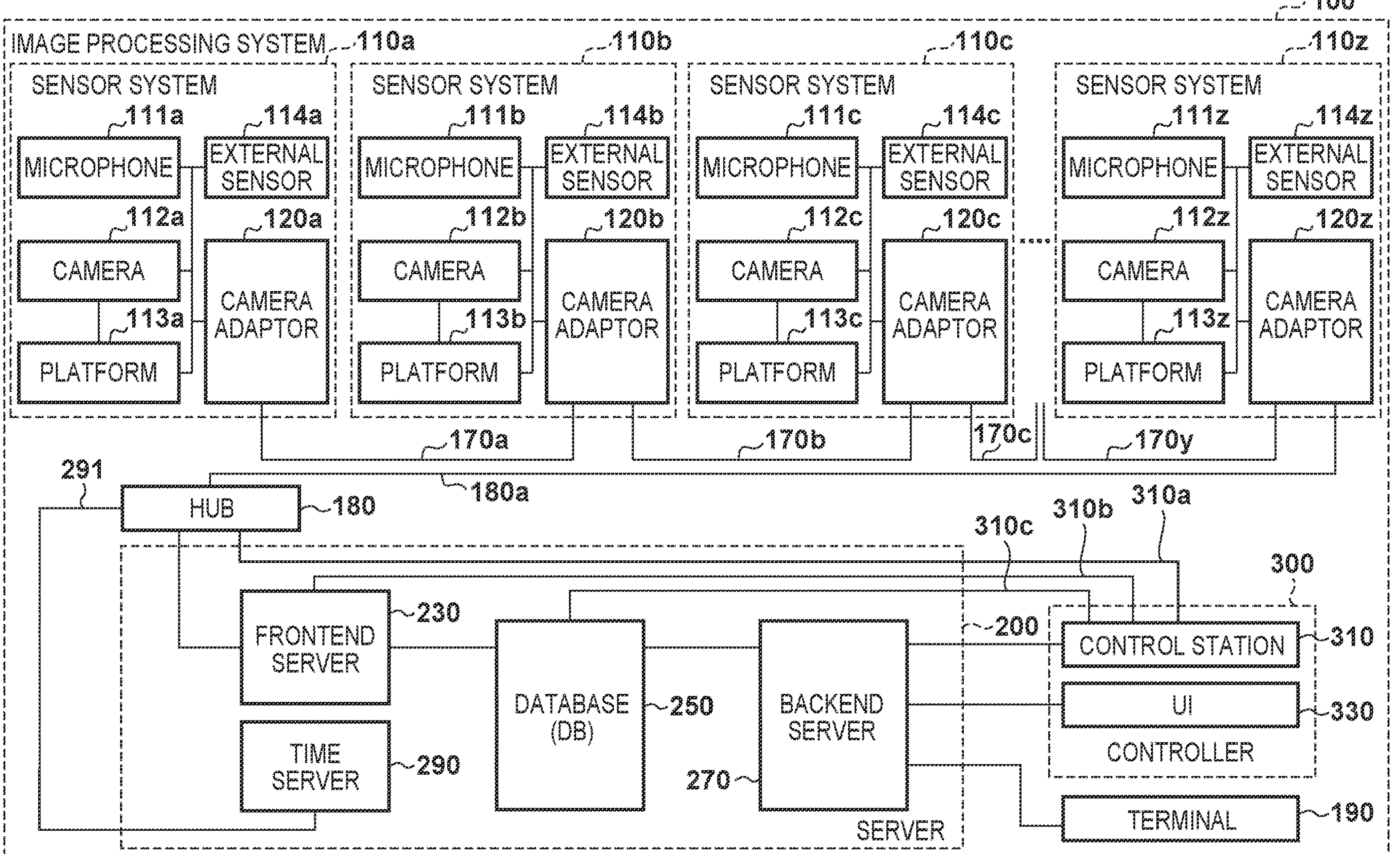
FIG. 1 is a view showing an example of the configuration of an image processing system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

A large-scale multicamera system will be constructed when capturing an image of a spatially large scene such as a sports scene. In this case, an image data amount to be generated by the whole system increases. Especially when transmitting image data across a network in the system, the bit rate of the image data may exceed the transmission bandwidth, which may lead to an unintended image data loss.

One embodiment of the present invention can reduce the image data amount while suppressing deterioration in quality of virtual viewpoint contents, in an arrangement that generates virtual viewpoint contents based on images captured by a plurality of image capturing apparatuses.

First Embodiment

An image processing system according to the first embodiment includes a plurality of image capturing units that capture images of an object from different viewpoints. In this embodiment, each image capturing unit is a camera, and the image capturing units (cameras) in a plurality of viewpoints capture images in synchronism with each other. An image processing system like this will be called a multicamera system hereinafter.

In one embodiment of the present invention, code amount control is performed based on the position of an object. In the first embodiment, priority is set for an image captured by each image capturing unit, and data amount control is performed based on this priority. Note that the priority for an image captured by the image capturing unit will simply be called the priority of the image capturing unit or the priority of a viewpoint (where the image capturing unit exists) in some cases.

A practical example that performs code amount control for image data at each viewpoint will be explained below. Image data at each viewpoint contains a plurality of captured images. Also, if the bit rate of an image at each viewpoint to be transmitted does not exceed the transmission band of the network, reversible data of the image at each viewpoint is transmitted. An image from a viewpoint having low priority is preferentially omitted only when the bit rate exceeds the transmission band. In the following example, the priority of a viewpoint having little influence on the overall quality is set low.

An example of the multicamera system will be explained with reference to a system configuration view shown in FIG. 1. An image processing system 100 shown in FIG. 1 as the multicamera system includes a plurality of image capturing apparatuses that capture images of an object from different viewpoints.

In this example shown in FIG. 1, the image processing system 100 includes 26 sensor systems 110_a_ to 110_z_. The sensor systems 110_a_ to 110_z_ as image capturing systems respectively include cameras 112_a_ to 112_z_ as image capturing apparatuses. As shown in FIG. 1, the sensor systems 110_a_ to 110_z_ may also respectively include microphones 111_a_ to 111_z_. The sensor systems 110_a_ to 110_z_ can be installed in facilities such as a stadium or a concert hall. The cameras 112_a_ to 112_z_ can capture images, and the microphones 111_a_ to 111_z_ can collect sounds.

In this specification, the 26 sensor systems 110_a_ to 110_z_ will collectively be called sensor systems 110, unless otherwise explained. Also, elements of the sensor systems 110_a_ to 110_z_ will collectively be called microphones 111, cameras 112, platforms 113, external sensors 114, and camera adaptors 120, unless otherwise explained. This embodiment uses the 26 sensor systems, but this is merely an example, and the number of sensor systems is not limited.

In this embodiment, a term "image" indicates both a moving image and a still image unless otherwise specified. That is, the image processing system 100 according to this embodiment can process both a still image and a moving image. Also, a virtual viewpoint content to be provided by the image processing system contains a virtual viewpoint image and a virtual viewpoint sound in the following example, but the present invention is not limited to this. For example, the virtual viewpoint content need not contain any sound. In this case, the sensor system 110 need not include a microphone. Furthermore, a sound contained in the virtual viewpoint content can be a sound collected by the microphone 111 of the sensor system 110 closest to the virtual viewpoint. The image processing system 100 according to this embodiment processes both images and sounds. In the following description, however, descriptions pertaining to sounds will partially be omitted in order to simplify the explanation. For example, sound data can be transferred in the same manner as image data.

The image processing system 100 further includes a server 200, a controller 300, a hub 180 such as a switching hub, and a terminal 190. The server 200 processes data obtained from the sensor system 110_z_. Therefore, the server 200 can store an image captured by each camera 112 as an image capturing apparatus.

First, an operation by which the sensor system 110_z_ transmits 26 sets of images and sounds generated by the sensor systems 110_a_ to 110_z_ to the server 200 will be explained. In this embodiment, the sensor systems 110_a_ to 110_z_ are daisy-chained as shown in FIG. 1.

Each of the sensor systems 110 (110_a_ to 110_z_) includes one of the cameras 112 (112_a_ to 112_z_). That is, the image processing system 100 includes a plurality of cameras 112 for image capturing an object in a plurality of directions. The cameras 112 of the plurality of sensor systems 110 perform image capturing in synchronism with each other, and output captured images obtained by the image capturing to the server 200.

In one embodiment, two or more of the plurality of sensor systems 110 are connected in series with the server 200. For example, the plurality of sensor systems 110 can be daisy-chained to each other. In the example shown in FIG. 1, all the sensor systems 110_a_ to 110_z_ are cascaded. Note that in this specification, the arrangement in which the plurality of sensor systems 110 are connected in series with the server 200 means that the server 200 can reach the plurality of sensor systems 110 without passing through the same transmission path (a cable or the like) twice or more. In the example shown in FIG. 1, the sensor systems 110_a_ to 110_z_ are connected to the server 200 via the hub 180, and the sensor systems 110_a_ to 110_z_ are connected in series with the server 200. A connection form like this can reduce the number of connection cables or save the labor of wiring work even when the volume of image data increases with an increase in resolution (for example, 4K or 8K) and an increase in frame rate of a captured image.

As another example, it is also possible to divide the plurality of sensor systems 110 into some groups, and daisy-chain the sensor systems 110 in each group. In this case, the camera adaptor 120 of the sensor system 110 positioned in the end of each group can be connected to the hub 180, so images can be input to the server 200 via the hub 180. An arrangement like this is effective particularly in a stadium. For example, when a stadium has a plurality of floors, the sensor systems 110 can be installed on each floor. In this case, it is possible to group the sensor systems 110 on one floor, or group the sensor systems 110 in each semicircle surrounding the stadium, and input images from each group to the server 200. Thus, even in a place in which it is difficult to perform wiring for connecting all the sensor systems 110 via one daisy chain, the convenience of installation or the flexibility of the system can be improved by adopting the group daisy chain.

The method of connecting the sensor systems 110, however, is not limited to this method. For example, the sensor systems 110*a* to 110*z* can also directly be connected to the hub 180. In this case, a star network configuration in which data exchange between the sensor systems 110 is performed via the hub 180 is obtained.

Note that image processing control operations in the server 200 can be switched in accordance with whether the number of daisy chains or the number of camera adaptors 120 that input images to the server 200 is 1 or 2 or more. That is, the control operations can be switched in accordance with whether the sensor systems 110 are divided into a plurality of groups. For example, when the number of the camera adaptors 120 that input images to the server 200 is 1, images are obtained from the whole circumference of the stadium while performing image transmission along the daisy chain. This synchronizes the timings at which the server 200 obtains image data of the whole circumference (from all the sensor systems 110). However, when the number of the camera adaptors 120 that input images to the server 200 is 2 or more, different transmission delays depending on the lanes (paths) of the individual daisy chains may occur. In this case, the server 200 can perform image processing in the later stage after checking that the image data of the whole circumference is obtained.

The sensor system 110*a* according to this embodiment includes the camera adaptor 120*a* and at least one of the camera 112*a* and the microphone 111*a*. The sensor system 110*a* can further include the platform 113*a* and the external sensor 114*a* as shown in FIG. 1, and can also include another component. In addition, the sensor system 110*a* can include a plurality of cameras 112*a* and a plurality of camera adaptors 120*a*. That is, the sensor system 110*a* can include N cameras 112*a* and M camera adaptors 120*a* (N and M are integers that are 1 or more), and the cameras 112*a* and the camera adaptors 120*a* correspond to each other by N:M like this. Furthermore, a frontend server 230 can have at least a part of functions of the camera adaptor 120*a*.

Note that the sensor systems 110*b* to 110*z* can have the same arrangement as that of the sensor system 110*a*, and can also have different arrangements. In one embodiment, each of the plurality of cameras 112 includes the camera adaptor 120 as shown in FIG. 1. Thus, the image processing system 100 can include a plurality of sensor systems 110 each including the camera adaptor 120 and the camera 112. In this case, each camera adaptor 120 can set the priority of an image captured by the camera 112 including the camera adaptor 120.

On the other hand, in another embodiment, at least one of the plurality of cameras 112 has the camera adaptor 120. In still another embodiment, each camera 112 has no camera adaptor 120. Another apparatus such as the frontend server 230 can also set the priority of an image captured by the camera 112 having no camera adaptor 120 to be explained below. In this case, the other apparatus has the same arrangement and the same function as the camera adaptor 120 to be explained below, and can set the priority of an image captured by the image capturing apparatus.

In the sensor system 110*a*, the microphone 111*a* collects a sound, and the camera 112*a* captures an image. After performing image processing (to be described later), the camera adaptor 120*a* transfers the sound and the image to the camera adaptor 120*b* of the sensor system 110*b* across a network 170*a*. The sensor system 110*b* transfers a similarly collected sound and a similarly captured image, together with the image and the sound obtained from the sensor system 110*a*, to the sensor system 110*c*. By repeating an operation like this, the images and the sounds obtained by the sensor systems 110*a* to 110*z* are transmitted to the server 200 via the sensor system 110*z*, a network 170, and the hub 180.

The camera 112 and the camera adaptor 120 are separated in the example shown in FIG. 1, but the camera 112 and the camera adaptor 120 may also be integrated (in, for example, the same housing). In addition, the microphone 111 can be incorporated into the camera 112, and can also be connected to the outside of the camera 112.

Next, the arrangement and operation of the server 200 will be explained. In this embodiment, the server 200 processes data obtained from the sensor system 110*z*. The server 200 includes the frontend server 230, a database 250, a backend server 270, and a time server 290.

The time server 290 supplies a signal for synchronizing the image capturing timings of the plurality of cameras 112. For example, the time server 290 can distribute a time signal and a sync signal to the sensor systems 110*a* to 110*z* via the hub 180. The camera adaptor 120 of the sensor system 110 can synchronize an image frame in accordance with the signals distributed from the time server 290. For example, the camera adaptor 120 can perform Genlock based on the time signal and the sync signal. With this arrangement, the image processing system 100 can generate a virtual viewpoint image based on a plurality of images captured at the same timing, and can suppress deterioration in quality of the virtual viewpoint image based on the difference between the image capturing timings. Instead of the time server 290, however, each camera 112 or each camera adaptor 120 can independently perform processing for time synchronization.

The frontend server 230 writes the image and the sound obtained from the sensor system 110*z* in the database 250. For example, the frontend server 230 can obtain segmented transmission packets from the sensor system 110*z*, and converts the data format so as to reconstruct the image and the sound from the transmission packets. The frontend server 230 can also store the image and the sound in the database 250 in association with the camera identifier, the data type, the frame number, and the like.

The backend server 270 obtains designation of a virtual viewpoint from the controller 300, and generates a virtual viewpoint image from the designated virtual viewpoint. The backend server 270 can generate a virtual viewpoint image by reading out image data and sound data to be used in processing from the database 250, and performing a rendering process. The backend server 270 transmits the virtual viewpoint image obtained by the rendering process to the terminal 190. Thus, the backend server 270 can generate a virtual viewpoint content based on images (a plurality of viewpoint images) captured by the plurality of cameras 112 and virtual viewpoint information. More specifically, the backend server 270 can generate a virtual viewpoint content based on, for example, a foreground image extracted by the plurality of camera adaptors 120 from images captured by the plurality of cameras 112, and a virtual viewpoint designated by the user. The extraction of a predetermined region by the camera adaptor 120 will be described later. The terminal 190 can provide the user with an image and a sound corresponding to the designated virtual viewpoint.

The virtual viewpoint image generation method is not particularly limited. For example, the backend server 270 can generate a 3D model of an object by using a captured image obtained by each sensor system 110. The backend server 270 can generate a 3D model of an object by using an arbitrary method. For example, it is possible to use the volume intersection method or the stereo matching method. Then, the backend server 270 can generate a virtual viewpoint image of the object from the virtual viewpoint, by using the 3D model of the object and the captured image obtained from each sensor system 110. The backend server 270 can generate a virtual viewpoint image by using an arbitrary method. As an example, the backend server 270 can specify the position on an object, which corresponds to a pixel of interest in a virtual viewpoint image from a virtual viewpoint, by using a 3D model of the object, and information indicating the position of the virtual viewpoint, the line-of-sight direction, and the viewing angle. Also, the backend server 270 can specify a pixel corresponding to the position of an object in a captured image by each camera 112, by referring to a camera parameter indicating the position of the camera 112. Then, the backend server 270 can determine color information of the pixel of interest by using color information of the pixel specified as described above. The backend server 270 can generate a virtual viewpoint image by performing this processing on each pixel of the virtual viewpoint image.

In this embodiment, the virtual viewpoint content is a content containing a virtual viewpoint image as an image obtained when capturing an image of an object from a designated viewpoint (virtual viewpoint). The virtual viewpoint image can also be regarded as an image representing the appearance of the object at the designated virtual viewpoint. A virtual viewpoint can be designated by the user, and can also automatically be designated based on, for example, the result of image analysis. That is, the virtual viewpoint image includes an arbitrary viewpoint image (free viewpoint image) corresponding to an arbitrary viewpoint designated by the user. The virtual viewpoint image also includes an image corresponding to a viewpoint designated from a plurality of candidates by the user, and an image corresponding to a viewpoint automatically designated by an apparatus. Note that an example in which the virtual viewpoint content contains sound data (audio data) will mainly be explained in this embodiment, but the virtual viewpoint content need not always contain sound data. Note also that the backend server 270 can encode the virtual viewpoint image by compression coding by using a standard technique such as H.264 or HEVC, and then transmit the image to the terminal 190 by using the MPEG-DASH protocol. Furthermore, the virtual viewpoint image can also be transmitted as an uncompressed image to the terminal 190. The former method in which compression coding is performed assumes the use of a smartphone or a tablet as the terminal 190, and the latter method assumes the use of a display capable of displaying an uncompressed image. That is, image formats can be switched in accordance with the type of the terminal 190. Also, the image transmission protocol is not limited to MPEG-DASH, and may also be, for example, HLS (HTTP Live Streaming) or another transmission method.

The arrangement of the server 200 is not limited to the above example. For example, at least two of the frontend server 230, the database 250, and the backend server 270 can be integrated. Also, the server 200 can include a plurality of sets of at least one of the frontend server 230, the database 250, and the backend server 270. Furthermore, the server 200 can include another apparatus. In addition, the terminal 190 or the controller 300 can have at least a part of the functions of the server 200.

The controller 300 includes a control station 310 and a UI 330. The control station 310 can perform operation state management, parameter setting control, and the like on each component of the image processing system 100 across the networks (for example, 310*a* to 310*c*, 180*a*, and 170*a* to 170*y*). The network may also be GbE (Gigabit Ethernet®) or 10 GbE complying with the IEEE standard as Ethernet®. The network can also be a combination of, for example, interconnect Infiniband and industrial Ethernet®. Furthermore, the network can be another type of network. The UI 330 is a virtual camera operation UI, and can be used to control, for example, the position of a virtual viewpoint, the line-of-sight direction, and the viewing angle of a virtual viewpoint image to be generated by using the image processing system 100 as will be described later.

As described above, the image processing system 100 has three functional domains, that is, an image collection domain, a data save domain, and an image generation domain. The image collection domain includes the sensor systems 110*a* to 110*z*. The data save domain includes the frontend server 230 and the database 250. The image generation domain includes the backend server 270, the controller 300 (particularly the UI 330), and the terminal 190. In this embodiment, the data save domain is arranged in an intermediate position as described above. With this arrangement, the frontend server 230 can convert image data and sound data generated by the sensor systems 110*a* to 110*z* and meta information of these data in accordance with a common schema and the data type of the database 250. Even when the type of the camera 112 of the sensor system 110 is changed, therefore, data can be registered in the database 250 after the frontend server 230 absorbs the data difference. This facilitates changing the type of the camera 112. On the other hand, the existence of the data save domain is not essential.

The controller 300 (the UI 330) does not directly access the database 250 but accesses the database 250 via the backend server 270. In this arrangement, the backend server 270 performs common processing pertaining to an image generation process, and the controller 300 performs processing pertaining to an operation UI that changes for each application. An arrangement like this makes it possible to focus on the development of a UI corresponding to a device for operating the UI or a function required for the UI in order to generate a desired virtual viewpoint image. Also, common processing pertaining to the image generation process to be performed by the backend server 270 can be added or deleted as needed in accordance with a request from the UI 330. With this arrangement, the backend server 270 can flexibly correspond to a request from the UI 330. On the other hand, the image processing system 100 is not limited to an arrangement like this. For example, the controller 300 (the UI 330) can directly obtain images from the sensor systems 110*a* to 110*z*.

In the image processing system 100 as described above, the backend server 270 generates a virtual viewpoint image based on image data obtained by the plurality of cameras 112 for capturing images of an object in a plurality of directions. Note that the image processing system 100 according to this embodiment is not limited to the abovementioned physical configuration, and may also logically be configured.

(Arrangement of Camera Adaptor)

The arrangement of the camera adaptor 120 will be explained below with reference to FIG. 2. The camera adaptor 120 is a control apparatus according to this embodiment and has a code amount control function. The camera adaptor 120 includes a network adaptor 2100, a transmission unit 2200, an image processing unit 2300, and an external device control unit 2400.

The network adaptor 2100 has a function of transmitting and receiving captured images. In this embodiment, the network adaptor 2100 includes a transmitter/receiver 2110 and a time controller 2120. The transmitter/receiver 2110 performs data communication with another camera adaptor 120, the frontend server 230, the time server 290, and the control station 310 across the networks 170, 291, and 310*a*. For example, the transmitter/receiver 2110 can transmit a foreground image and a background image generated from a captured image by the camera 112 by a separator 2310 to a next camera adaptor 120. The next camera adaptor 120 is the camera adaptor 120 next to the camera adaptor 120 as the transmission source in a predetermined order. For example, in an arrangement in which a plurality of sensor systems 110 are daisy-chained, an image can be transmitted to the camera adaptor 120 closest to the server. Thus, each camera adaptor 120 outputs a foreground image and a background image, and a virtual viewpoint image is generated based on foreground images and background images obtained by image capturing at a plurality of viewpoints. Note that the camera adaptor 120 that outputs a foreground image separated from a captured image and outputs no background image may also exist.

The time controller 2120 manages current time information. The time controller 2120 can perform time synchronization with respect to the time server 290. The time controller 2120 can also save the timestamp of data exchanged with the time server 290. The time controller 2120 can perform an operation complying with, for example, Ordinary Clock of the IEEE1588 standard. However, the time controller 2120 can also perform time synchronization with respect to the time server 290 in accordance with another Ethernet AVB standard or a unique protocol. Note that the IEEE1588 is updated as a standard specification like the IEEE1588-2002 and the IEEE1588-2008, and the latter is also called PTPv2 (Precision Time Protocol Version2).

In this embodiment, a NIC (Network Interface Card) is used as the network adaptor 2100. However, another similar interface may also be used as the network adaptor 2100.

The transmission unit 2200 has a function of controlling transmission of data to the hub 180 and the like via the network adaptor 2100. The arrangement of the transmission unit 2200 will be explained below. A code processor 2210 has a function of compressing data and a function of decompressing compressed data. For example, the code processor 2210 can compress data to be transmitted via the transmitter/receiver 2110, in accordance with a predetermined compression method, a predetermined compression rate, and a predetermined frame rate.

A synchronization controller 2230 controls time synchronization with respect to the time server 290. The synchronization controller 2230 can have a function complying with a PTP (Precision Time Protocol) of the IEEE1588 standard. On the other hand, the synchronization controller 2230 can also perform time synchronization by using another similar protocol.

A transmission processor 2240 generates a message to be transferred to another camera adaptor 120 or the frontend server 230 via the transmitter/receiver 2110. Image data or sound data is transferred as a message. For example, the message can contain the image data or the sound data, and meta information of the data. Examples of the meta information are the time code or the sequence number at the time of image capturing or sound sampling, the data type, and the identifier that specifies the camera 112 or the microphone 111 having acquired the image or the sound. The image data or the sound data to be transmitted in this manner can also be compressed by the code processor 2210. The transmission processor 2240 can also receive a message from another camera adaptor 120 via the transmitter/receiver 2110. The transmission processor 2240 can restore the data fragmented in accordance with the packet size defined in the transmission protocol to the image data or the sound data as needed, by referring to the data type of the message. If the restored data is compressed, the code processor 2210 can decompress the compressed data.

Figure 3:
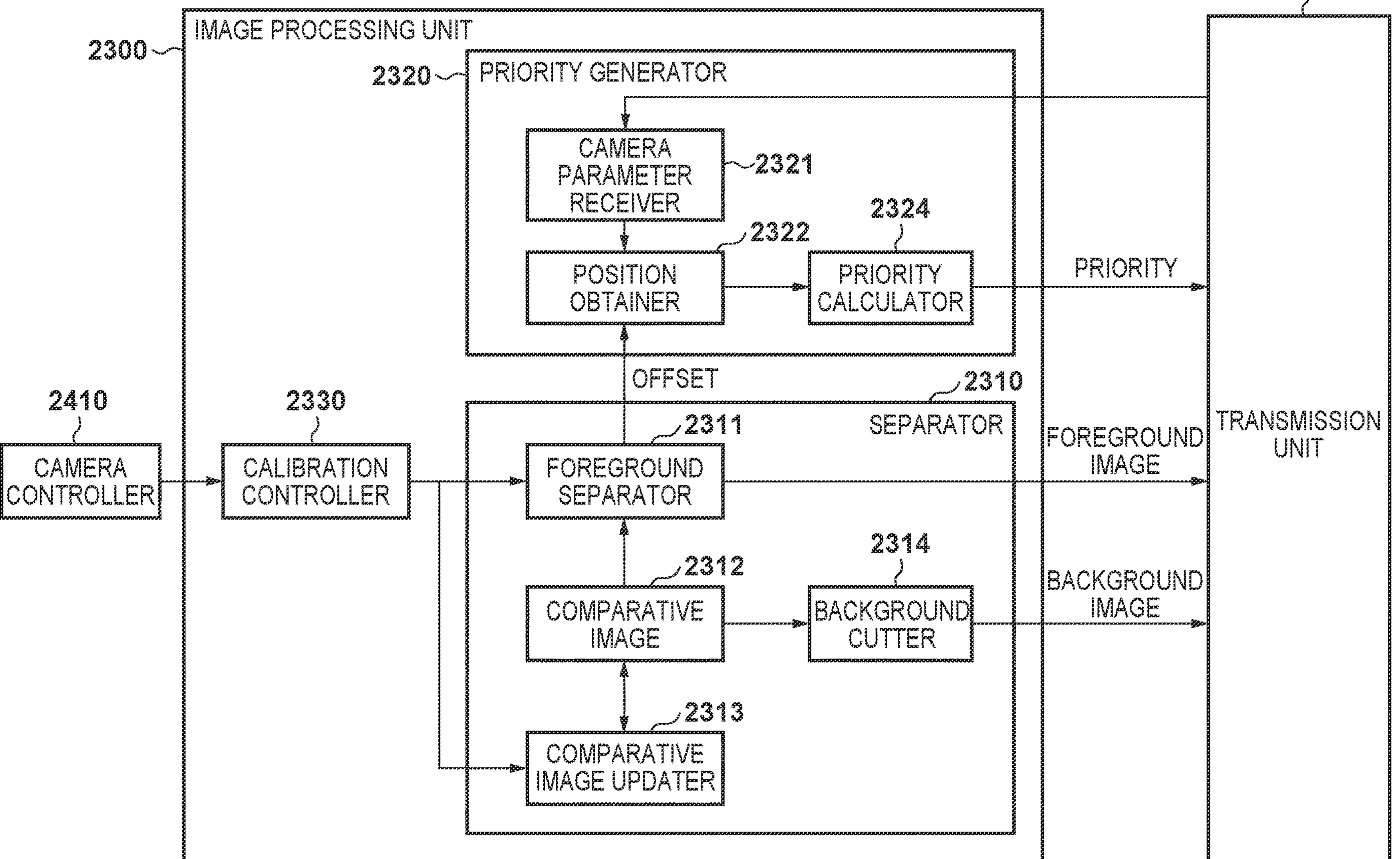
FIG. 3 is a block diagram showing a configuration example of an image processing unit 2300.

The image processing unit 2300 processes image data obtained by image capturing of the connected camera 112, and image data received from another camera adaptor 120. The arrangement of the image processing unit 2300 will be explained in more detail below with reference to FIG. 3 as a functional block diagram of the image processing unit 2300.

A calibration controller 2330 acquires and transmits information necessary for calibration. The calibration controller 2330 can acquire image data necessary for calibration from the camera 112 via a camera controller 2410. The calibration controller 2330 can also transmit acquired information to the frontend server 230 that performs a calibration process. However, the calibration process may also be performed by another node such as the control station 310 or the camera adaptor 120 (including its own camera adaptor 120 or another camera adaptor 120).

The calibration controller 2330 can also perform calibration (dynamic calibration) during image capturing on image data obtained from the camera 112 via the camera controller 2410, in accordance with a preset parameter. For example, the calibration controller 2330 can perform, on a captured image, a color correction process for suppressing color variations between cameras, or an image stabilization process (electronic antivibration processing) for stabilizing the position of an object against a camera shake caused by camera vibrations.

For example, the calibration controller 2330 can perform a correction process of reducing the influence of vibrations of the image capturing apparatus. That is, the calibration controller 2330 can generate a vibration-suppressed image by referring to information representing the vibrations of the camera 112. This information representing vibrations can be obtained from the external sensor 114 as will be described later. The calibration controller 2330 can perform processing like this prior to processing in the separator 2310.

For example, the calibration controller 2330 can perform a process of suppressing a positional deviation of an object caused by the influence of vibrations between frames, on an image captured by the camera 112, by referring to the information representing vibrations. The calibration controller 2330 can also align images captured by the cameras 112 by referring to the information representing vibrations. For example, the calibration controller 2330 can cut out, from image data obtained by a connected 8K camera, an image having a size smaller than the original 8K size, and align the image with an image by the camera 112 installed adjacent to the 8K camera, by taking account of the vibration information. With this arrangement, even when the framework vibrations of the building propagate at different frequencies to the cameras 112, the camera adaptors 120 can align images. Consequently, it is possible to implement electronical antivibration of image data, and reduce the alignment processing load corresponding to the number of cameras 112 in the server 200.

The separator 2310 can separate an image obtained by the camera 112 into a foreground image and a background image. The separator 2310 can extract an object from a captured image, and an image of the extracted object can be called a foreground image. That is, the separator 2310 of each of the plurality of camera adaptors 120 extracts a predetermined region from a captured image obtained by the corresponding one of the plurality of cameras 112. The predetermined region is, for example, an object region detected by object detection performed on a captured image. An image of the predetermined region extracted as described above is a foreground image, and an image of the residual region is a background image.

The type of object to be detected by object detection is not particularly limited, and may also be a person. In addition, an object to be detected can be a specific person (for example, a specific player, a manager, and/or an umpire), and can also be a specific object (for example, an object having a predetermined image pattern, such as a ball or a goal). A moving object may also be detected as an object. By thus separating the foreground image containing an important object such as a person from the background image not containing an object like this, the quality of a portion corresponding to the object can be increased in a virtual viewpoint image to be generated in the image processing system 100. In addition, since each of the plurality of camera adaptors 120 performs the separation of the foreground image and the background image, the load on the image processing system 100 can be dispersed. In an arrangement like this, the load on the server 200 for performing the foreground/background separation process can be reduced when, for example, generating a 3D model or a virtual viewpoint image. Note that the foreground image is not limited to an image of a predetermined region. For example, an image of a predetermined region may also be the background image.

Each component of the separator 2310 will be explained in detail below. A foreground separator 2311 separates a foreground image from image data of a captured image aligned by the calibration controller 2330. In this configuration example shown in FIG. 3, the foreground separator 2311 performs the foreground image separation process by comparing a captured image with a comparative image 2312 obtained from a background image in advance. For example, the foreground separator 2311 can extract, as a foreground image, a region where the difference between pixel values of the captured image and the comparative image 2312 is equal to or larger than a threshold. The foreground separator 2311 can output image data of the foreground image obtained as described above. The foreground separator 2311 can also output the offset value (the position of a pixel in the upper left corner of a circumscribed rectangle of the foreground image) of the foreground image region in the whole captured image, in association with the foreground image.

A comparative image updater 2313 updates the comparative image 2312 by using image data of a captured image aligned by the calibration controller 2330. For example, a background cutter 2314 can extract, from a captured image, an image (background image) of a region (background region) where the difference between pixel values of the captured image and the comparative image 2312 is smaller than a threshold. Then, the comparative image updater 2313 can update a portion of the comparative image 2312, which corresponds to the background region, by the background image extracted as described above. The background cutter 2314 can cut out the portion of the captured image as the background image and output the cutout image.

A priority generator 2320 sets priority. In this embodiment, the priority generator 2320 can set, for an image captured by an image capturing apparatus, priority in accordance with the similarity between a viewpoint direction from the position of an object to the image capturing apparatus and a viewpoint direction from the position of the object to another image capturing apparatus. An exemplary setting method will be described later with reference to FIG. 4.

When setting priority, the priority generator 2320 can use the foreground image obtained from the separator 2310 and camera parameters. The camera parameters can include internal parameters unique to the camera, external parameters representing the position/posture of the camera with respect to the global coordinate system, and external camera information. The internal parameters can include, for example, the focal length, the sensor pitch, the image central position, and the lens distortion parameter of the camera 112. The external parameters can include the viewpoint position, the posture, and the like of the camera 112. Furthermore, the external camera information can include the viewpoint position or the image capturing region of another camera 112 different from the camera 112 connected to the camera adaptor 120. These camera parameters can also be estimated from an image obtained by the camera 112.

Each component of the priority generator 2320 will be explained in detail below. A position obtainer 2322 obtains the position of an object. In this embodiment, the position obtainer 2322 obtains the position of an object by using the result of object extraction performed on a captured image. For example, based on the position of an object extracted as a foreground by the separator 2310, the position obtainer 2322 can obtain the position of the object. In this embodiment, the position obtainer 2322 obtains the position of an object in an image capturing scene, by using the offset value of a foreground image obtained by the foreground separator 2311, and the camera parameters received via the transmission unit 2200, and outputs the object position to a priority calculator 2324.

Note that the object position obtaining method is not limited to this method, and the position obtainer 2322 may also obtain the position of an object from another device such as a position measurement device. The position obtainer 2322 can also obtain the position of an object by using a captured image having undergone the correction process that is performed by the calibration controller 2330 to reduce the influence of vibrations of the image capturing apparatus. That is, the position obtainer 2322 can also obtain the position of an object based on an object region extracted by the separator 2310 from a captured image having undergone the correction process.

A camera parameter receiver 2321 receives camera parameters. This information is transmitted and set from the control station 310 to the camera adaptor 120 as a target.

A priority calculator 2324 sets the priority of an image captured by the image capturing apparatus (camera 112), based on the position of an object. The priority calculator 2324 can calculate the priority of the camera 112 (or of a captured image obtained by the camera 112), and output the priority to the transmission unit 2200. In this embodiment, the priority calculator 2324 sets, for an image captured by an image capturing apparatus, priority in accordance with the similarity between a viewpoint direction from the position of an object to the image capturing apparatus, and a viewpoint direction from the position of the object to another image capturing apparatus.

The external device control unit 2400 controls a device connected to the camera adaptor 120. The arrangement of the external device control unit 2400 will be explained below. The camera controller 2410 is connected to the camera 112 and controls the camera 112. The camera controller 2410 can obtain a captured image from the camera 112. The control of the camera 112 includes, for example, setting of and reference to image capturing parameters (the number of pixels, the color depth, the frame rate, the setting of white balance, and the like), and acquisition of state information (under image capturing, under suspension, under synchronization, error, and the like) of the camera 112. The control of the camera 112 also includes, for example, the start and stop of image capturing by the camera 112, and the focus adjustment of the camera 112. The camera controller 2410 can perform the focus adjustment of the lens of the camera 112 via the camera 112, and can also directly perform the focus adjustment by connecting to an interchangeable lens mounted on the camera 112. The camera controller 2410 can further perform the adjustment of the lens of the camera 112, such as zoom adjustment.

The camera controller 2410 can also provide a sync signal to the camera 112 and set time in the camera 112. For example, the camera controller 2410 can provide the camera 112 with a sync signal (control clock) indicating the image capturing timing by referring to time synchronized with the time server 290, under the control of the synchronization controller 2230. In addition, the camera controller 2410 can provide the camera 112 with the synchronized time as a time code complying with the format of, for example, SMPTE12M. Thus, the camera controller 2410 can receive image data to which the provided time code is given, from the camera 112. Note that the time code may also have another format. Note also that the camera controller 2410 can also give the time code to image data received from the camera 112, and need not provide any time code to the camera 112 in this case.

A microphone controller 2420 is connected to the microphone 111 and controls the microphone 111. The microphone controller 2420 can also obtain sound data collected by the microphone 111. The control of the microphone 111 includes, for example, the start and stop of sound collection, gain adjustment, and state acquisition. Like the camera controller 2410, the microphone controller 2420 can provide the microphone 111 with a sync signal indicating the timing of sound sampling, and a time code. For example, as the sync signal, the microphone controller 2420 can supply the microphone 111 with clock information obtained by converting time information from the time server 290 into a 48-kHz word clock.

A platform controller 2430 is connected to the platform 113 and controls the platform 113. The control of the platform 113 includes, for example, pan/tilt control and state acquisition.

A sensor controller 2440 is connected to the external sensor 114 and acquires sensor information obtained by sensing by the external sensor 114. For example, when using a gyro sensor as the external sensor 114, the sensor controller 2440 can acquire information representing vibrations from the external sensor 114. Note that the sensor system 110 can also have a sensor incorporated into the camera adaptor 120, instead of or in addition to the external sensor 114. A built-in sensor like this can also be used in the same manner as the external sensor.

(Setting of Priority)

The processes of code amount control by the priority generator 2320, the code processor 2210, and the transmission processor 2240 will be explained in detail below. First, the process of generating priority will be explained with reference to a flowchart shown in FIG. 4. The process of generating the priority of the camera 112*a* by the camera adaptor 120*a* of the sensor system 110*a* will be explained below, but the camera adaptors 120*b* to 120*z* can also perform the same process.

FIG. 4 is a flowchart showing the procedure of a process of calculating priority by the priority generator 2320. In step S401, the camera parameter receiver 2321 obtains the camera parameters. In step S402, the position obtainer 2322 obtains the offset value of a foreground image.

In steps S403 to S405, the position obtainer 2322 calculates the position of an object in an image capturing scene. As described previously, the position obtainer 2322 can use the foreground image obtained by object extraction. Assume that in the image capturing scene, an object such as a person exists on one plane (image capturing plane). The object position is the point at which the object comes in contact with the image capturing plane. Also, in the whole image capturing scene in which the image processing system 100 is installed, a global coordinate system (three-dimensionally expressed by x, y, and z) in which the image capturing plane is z=0 is set.

In step S403, the position obtainer 2322 selects a representative pixel of the object. In this embodiment, the lowermost pixel of the foreground image is selected as a representative pixel representing the point at which the object and the image capturing plane (for example, a human foot and the ground) come in contact with each other. If a plurality of pixels exist in the lowermost position, the position obtainer 2322 can select an arbitrary one of the plurality of pixels, for example, a central pixel.

In step S404, the position obtainer 2322 calculates a representative line-of-sight representing a line-of-sight direction from the camera 112*a* to a position corresponding to the representative pixel. In this step, the position obtainer 2322 of the camera adaptor 120*a* of the sensor system 110*a* calculates a representative line-of-sight from the camera 112*a* of the same sensor system 110*a*. The position obtainer 2322 can calculate the representative line-of-sight by using the camera parameters (for example, the viewpoint position, the camera posture, and the focal length) obtained in advance.

Figure 5A:
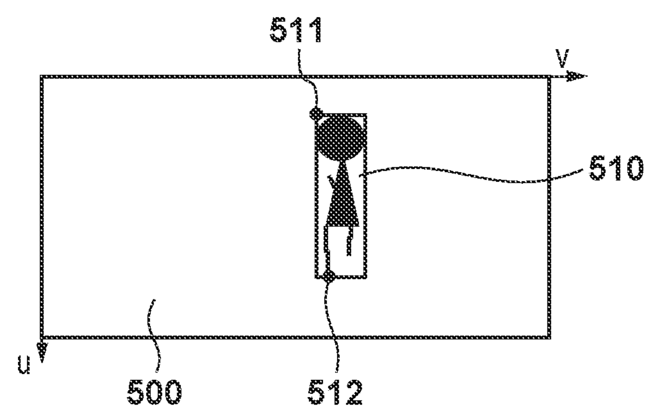
FIGS. 5A and 5B are views for explaining an object position estimating method.

FIG. 5A shows a captured image 500 and a foreground image 510 extracted from the captured image 500. The coordinates of each pixel of the captured image are represented by (v, u). As described previously, an offset value 511 of the foreground image 510 is a pixel position (uo, vo) in the upper left corner of the circumscribed rectangle of the foreground image. The region of the foreground image 510 is equivalent to the silhouette of the object, and the lowermost pixel is selected as a representative pixel 512 (ur, vr).

Figure 5B:
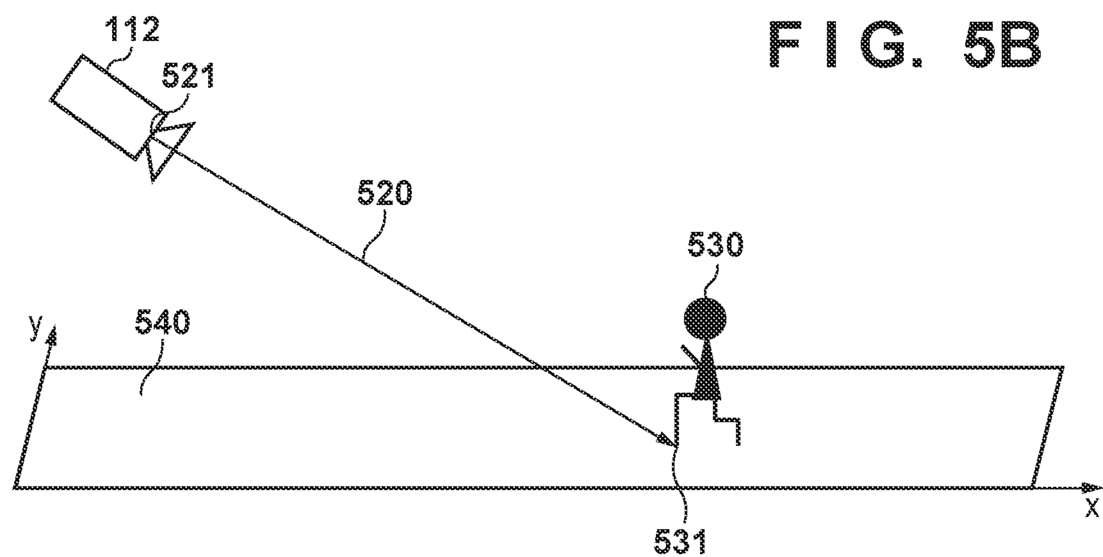

The representative line-of-sight in the camera coordinate system of the camera 112*a* can be obtained from this representative pixel position (ur, vr) and the internal parameters (for example, the focal length) of the camera 112*a*. Also, as shown in FIG. 5B, a representative line-of-sight 520 in the global coordinate system can be obtained from the external parameters (a viewpoint position 521 and the camera posture) of the camera 112*a* and the representative line-of-sight in the camera coordinate system.

In step S405, the position obtainer 2322 calculates an object position (xr, yr, 0). As shown in FIG. 5B, the intersection of the representative line-of-sight and an image capturing plane 540 (z=0) is an object position 531 (xr, yr, 0) of an object 530. In steps S404 and S405 as described above, the position obtainer 2322 converts the position (ur, vr) of the representative pixel obtained in step S403 into the object position (xr, yr, 0) on the image capturing plane.

In steps S406 to S408, the priority calculator 2324 calculates priority. This process will be explained below with reference to FIG. 7. As shown in FIG. 7, the process will be explained by taking an example in which a plurality of daisy-chained cameras 112*a* to 112*i* capture images of one object 700 existing in a field 790.

In this example, the priority calculator 2324 sets, for an image captured by the image capturing apparatus, priority in accordance with the similarity between a viewpoint direction from the object position obtained in step S405 to the camera 112*a*, and a viewpoint direction from the object position to another image capturing apparatus. For example, the priority calculator 2324 can set a lower priority for the camera 112*a* if a viewpoint direction from the object position to the camera 112*a* and a viewpoint direction from the object position to another camera 112 are more similar to each other. This is so because even if a captured image by the camera 112*a* is missing, it is highly likely that this missing can be compensated for by an image by the camera 112 close to the camera 112*a*, so the influence on a virtual viewpoint image to be generated is presumably small. Accordingly, the priority for the camera 112*a* becomes lower, and this decreases the priority of transfer or storage of an image captured by the camera 112*a* as will be described later.

The priority calculator 2324 can calculate an evaluation value for the similarity between a viewpoint direction from the object position to the image capturing apparatus, and a viewpoint direction from the object position to another image capturing apparatus, and set priority in accordance with this evaluation value for an image captured by the image capturing apparatus. In the following example, the priority calculator 2324 selects an adjacent viewpoint for the camera 112*a*, and calculates an evaluation value for the similarity between a viewpoint direction from the object position to the camera 112*a* and a viewpoint direction from the object position to the adjacent viewpoint.

In step S406, the priority calculator 2324 selects an adjacent viewpoint for the camera 112*a*. The priority calculator 2324 can select an adjacent viewpoint from a camera having an image capturing region on the image capturing plane including the object position obtained in step S405.

More specifically, the priority calculator 2324 can select a camera adjacent to the camera 112*a* from the cameras 112. In this embodiment, the priority calculator 2324 selects two cameras 112 as adjacent viewpoints. The priority calculator 2324 can select cameras in accordance with pre-obtained information indicating the closeness between the camera 112*a* and each camera 112. For example, when a plurality of cameras 112 are surrounding the object 700 as shown in FIG. 7, the priority calculator 2324 can select a camera closest to the camera 112*a* in the clockwise direction as an adjacent camera. In addition, the priority calculator 2324 can select a camera closest to the camera 112*a* in the counter-clockwise direction as an adjacent camera. In this example, the cameras 112*b* and 112*i* are selected as adjacent viewpoints for the camera 112*a*.

Note that the priority calculator 2324 can also select, based on the position of an object, an image capturing apparatus having an image capturing range in which the object exists, from a plurality of image capturing apparatuses. That is, from the plurality of cameras 112, the priority calculator 2324 can elect a camera having an image capturing region containing an object, for example, a camera containing the object position in the image capturing region. In this case, the priority calculator 2324 can set, for an image captured by the image capturing apparatus, priority in accordance with the similarity between a viewpoint direction from the object position to the image capturing apparatus and a viewpoint direction from the object to each of the selected image capturing apparatuses.

Figure 6:
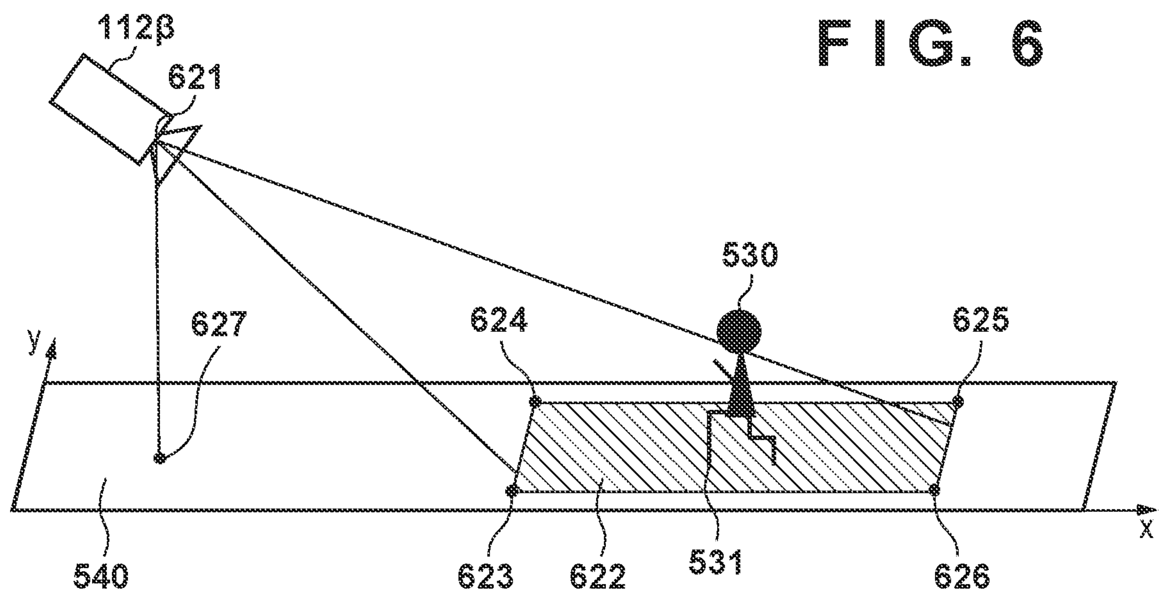
FIG. 6 is a view for explaining an image capturing region of a camera.

FIG. 6 shows a camera 112β containing the object position 531 in an image capturing region 622. A viewpoint position 621 of the camera 112β is represented by (xβ, yβ, zβ). In this embodiment, each camera 112 has information indicating the image capturing region 622 on the image capturing plane 540 of another camera as external camera information, for example, has information indicating the positions of four vertexes 623 to 626 of the image capturing region 622. Therefore, the priority calculator 2324 can select the camera 112 having an image capturing region containing an object, based on the information indicating the image capturing region 622 of each camera 112, and the object position 531. In an arrangement like this, an adjacent viewpoint is selected from cameras capturing images of an object, and cameras not capturing images of the object are ignored. This makes it possible to more accurately evaluate the influence on an image of an object in a virtual viewpoint image, when a captured image by the camera 112*a* is missing.

In step S407, the priority calculator 2324 calculates a line of sight from the adjacent viewpoint to the object position. In this embodiment, a line of sight on the image capturing plane is calculated in order to simplify the processing. That is, in this embodiment, each camera 112 has information indicating the viewpoint position on the image capturing plane 540 of another camera as external camera information. As shown in FIG. 6, the priority calculator 2324 calculates a direction (vector) from a viewpoint position 627 (xβ, yβ) of the camera 112β as the adjacent viewpoint to the object position 531, as the line of sight of the adjacent viewpoint on the image capturing plane 540. FIG. 7 shows a line of sight 710*b* of the camera 112*b* and a line of sight 710*i* of the camera 112*i* obtained as described above.

In step S408, the priority calculator 2324 calculates an angle made by the lines of sight of the two adjacent viewpoints. FIG. 7 shows angles θ1 to θ9 made by the lines of sight of cameras adjacent to each other. For the camera 112*a*, θ1+θ9 is calculated as an angle made by the lines of sight of the adjacent viewpoints (the cameras 112*b* and 112*i*) of the camera 112*a*. The calculated value θ1+θ9 can be used as an evaluation value for the similarity between the viewpoint direction from the object position to the camera 112*a*, and the viewpoint direction from the object position to the adjacent viewpoint. In this embodiment, the value θ1+θ9 is used as the priority for the camera 112*a* (or for an image captured by the camera 112*a*).

This value calculated as described above represents the angular density of viewpoints (cameras), as the density of viewpoint directions from an object to a plurality of cameras, in the viewpoint direction from the object to the camera 112*a*. A high angular density indicates a high similarity between a viewpoint direction from the position of an object to the camera 112*a*, and a viewpoint direction from the object to a selected viewpoint. When this angular density is high, therefore, even if an image by a camera is missing, the possibility that this missing image is compensated for by a camera at an adjacent viewpoint is high, so the influence on a virtual viewpoint image to be generated is small. In this embodiment, therefore, the priority is decreased as the angular density increases (as the angle made of the lines of sight of two adjacent viewpoints decreases).

In step S409, the priority calculator 2324 outputs the priority calculated in step S408.

Note that the priority calculation method is not limited to the abovementioned method. For example, an angle made by the lines of sight of cameras adjacent to each other on a 3D space may also be used instead of the angles θ1 to θ9 on the plane shown in FIG. 7. It is also possible to evaluate the density of viewpoint directions in a viewpoint direction from the position of an object to the camera 112*a*, based on the distribution of parameters (azimuth and elevation) of a 3D vector from the object position to each camera 112.

(Code Amount Control)

A method of controlling the code amount based on the priority by the transmission unit 2200 will be explained below. The transmission unit 2200 can control the transfer or storage of a captured image in accordance with the priority. That is, the transmission unit 2200 can preferentially transfer or store a captured image having high priority. In other words, the transmission unit 2200 can preferentially discard a captured image having low priority. The use of an arrangement that discards some image data decreases the transmission delay of image data, and this facilitates obtaining highly real-time virtual viewpoint contents.

A practical code amount control method of the transmission unit 2200 is not particularly limited. In the following example, the transmission unit 2200 of the camera adaptor 120 connected to the camera 112 (a second image capturing apparatus) transmits an image captured by the camera 112 (the second image capturing apparatus) to a transmission destination apparatus such as another camera adaptor 120 or the frontend server 230. Also, the transmission unit 2200 of the camera adaptor 120 connected to the camera 112 (the second image capturing apparatus) receives an image captured by another camera 112 (a first image capturing apparatus), and transmits the image to the transmission destination apparatus. In this case, the transmission unit 2200 controls the transmission in accordance with the priority set for each captured image.

Figure 8:
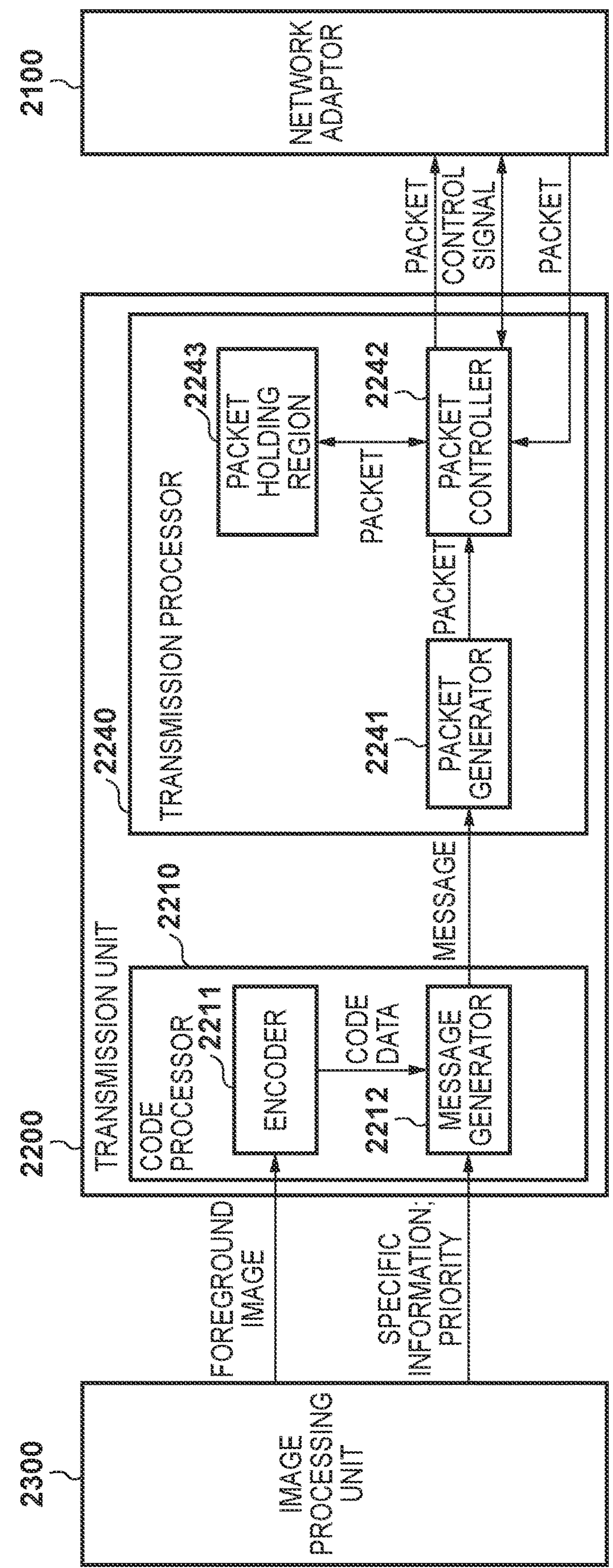
FIG. 8 is a block diagram showing a configuration example of a transmitting unit 2200.

In the following example, code amount control is performed when transmitting a foreground image obtained by the separator 2310. That is, in the following example, the transmission unit 2200 controls the transfer of the foreground image in accordance with the priority. More specifically, the transmission unit 2200 generates packets by encoding the foreground image, and controls the code amount based on the priority. FIG. 8 is a block diagram showing an arrangement for this processing in the transmission unit 2200, and some processors of the transmission unit 2200 are omitted.

Note that the transmission unit 2200 can also transmit a background image obtained by the separator 2310 to the frontend server 230 via the camera adaptor 120 of another sensor system 110. The transmission unit 2200 can control the code amount of the background image based on the priority, in the same manner as that for the foreground image, but does not have to do this control. The transmission unit 2200 can also compress the background image at a compression ratio higher than that of the foreground image, and transmit the compressed background image to the frontend server 230. Furthermore, the transmission unit 2200 can transmit the captured image to the frontend server 230, instead of separately transmitting the foreground image and the background image. In this case, the transmission unit 2200 can control the code amount of the captured image based on the priority.

The code processor 2210 includes an encoder 2211 and a message generator 2212. The encoder 2211 encodes the received foreground image and sends the encoded image to the message generator 2212. The message generator 2212 receives code data, specific information of the code data, and priority information. The specific information is information that specifies the camera 112 having captured the corresponding code data, or specifies the foreground image of the corresponding code data. This information can be used in decoding of the image data. The message generator 2212 generates a message so that the code data is stored in a data area of the message and the priority and the specific information are stored in a header area, and outputs the message to the transmission processor 2240.

The transmission processor 2240 includes a packet generator 2241, a packet controller 2242, and a packet holding region 2243. The packet generator 2241 generates a plurality of packets by decomposing the message obtained from the code processor 2210 into predetermined sizes. The packet controller 2242 receives packets based on an image captured by the sensor system 110*a* from the packet generator 2241, and also receives packets on the network from the network adaptor 2100. Then, the packet controller 2242 discards packets in accordance with the priority, and outputs packets to the network adaptor 2100.

Figure 9:
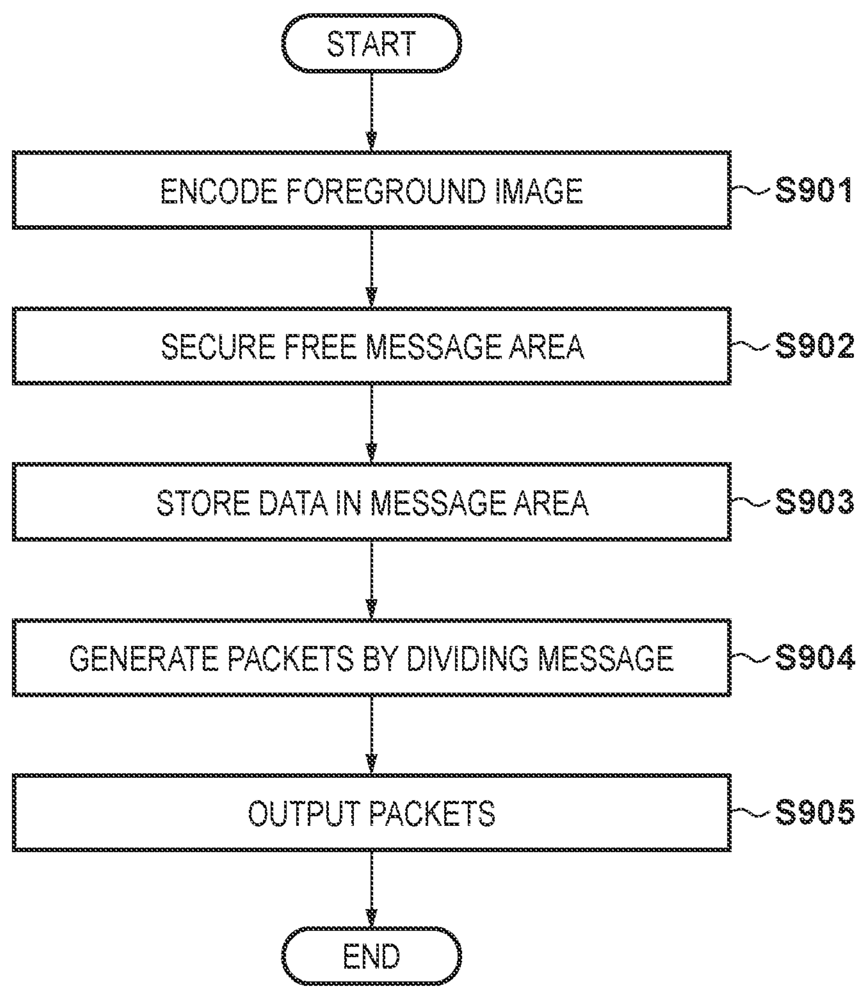
FIG. 9 is a flowchart showing an example of a process of packetizing a captured image.

FIG. 9 is a flowchart of processing from the reception of the foreground image and the priority by the code processor 2210 to the generation of packets by the packet generator 2241. In step S901, the encoder 2211 generates code data by encoding the foreground image. In step S902, the message generator 2212 secures a free message area for storing the code data. The size of the message depends on the size of the code data. In step S903, the message generator 2212 stores the specific information and the priority in the header area of the message area, and stores the code data in the data area.

In step S904, the packet generator 2241 generates a plurality of packets by dividing the message generated in step S903 into predetermined sizes. If the message is smaller than the predetermined size, the packet generator 2241 can generate one packet without dividing the message. The packet generator 2241 stores, in the header area of the packet, the priority and the specific information stored in the header area of the message. When dividing the message, the packet generator 2241 can add information indicating a part of the message to which each packet corresponds, to the specific information in the header area of the packet.

Figure 10B:
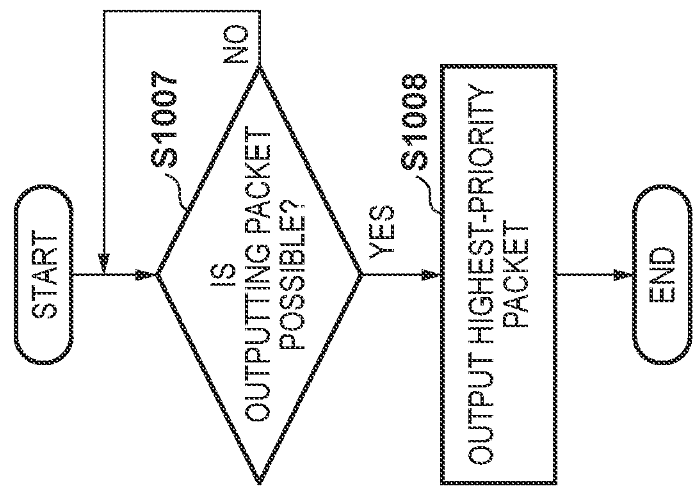
FIGS. 10A and 10B are flowcharts each showing an example of a packet transfer control process.
Figure 10A:
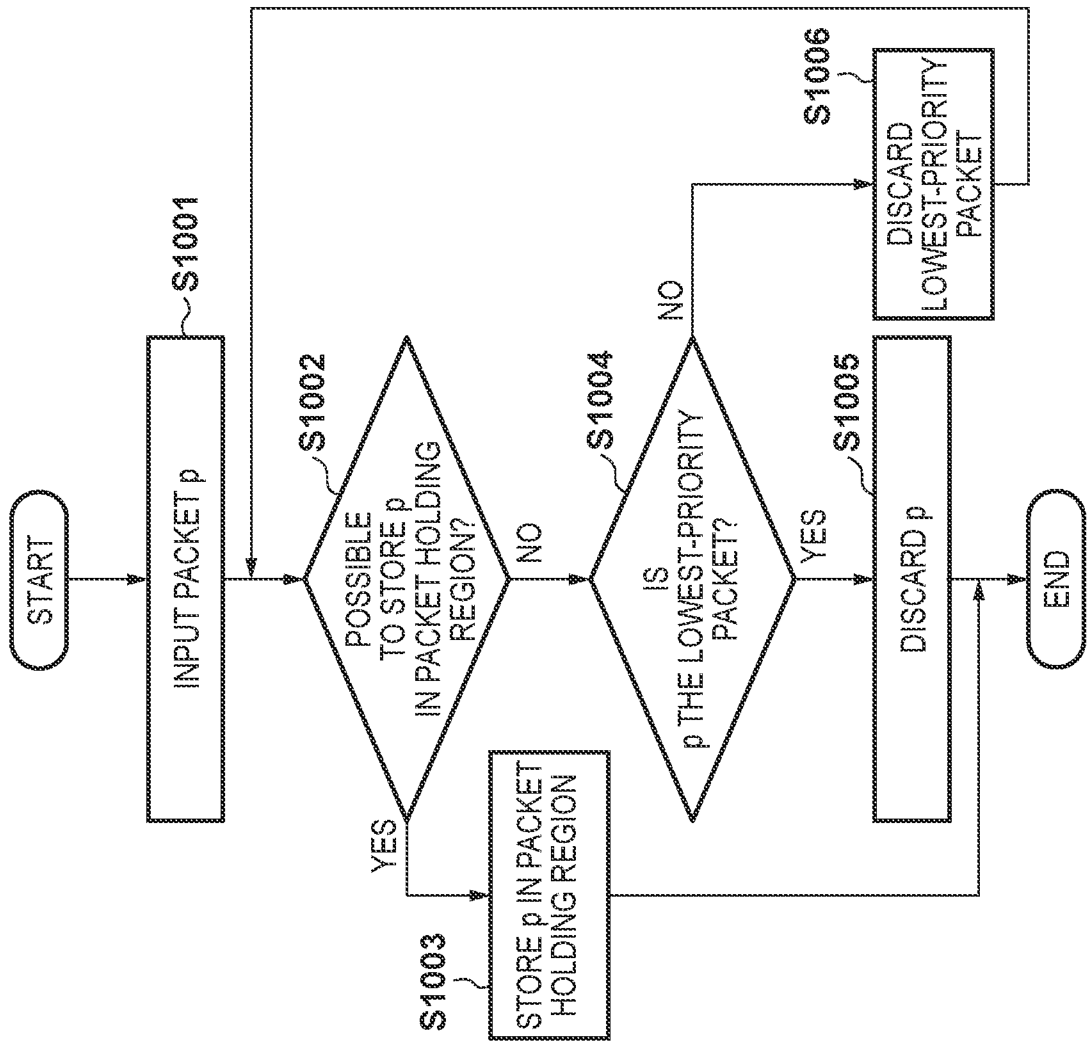

FIGS. 10A and 10B are flowcharts of processing to be performed by the packet controller 2242. FIG. 10A shows a process of discarding a packet in accordance with the priority. In step S1001, the packet controller 2242 obtains a packet p. In step S1002, the packet controller 2242 determines whether the packet holding region 2243 has a free area for holding the packet p. If there is a free area, the process advances to step S1003, and the packet controller 2242 stores the packet p in the packet holding region 2243. If there is no free area, the process advances to step S1004, and the packet controller 2242 determines whether the priority of the packet p is lower than the lowest priority of packets stored in the packet holding region 2243. If the priority of the packet p is lower, the process advances to step S1005, and the packet controller 2242 discards the packet p. If the priority of the packet p is not lower, the process advances to step S1006, and the packet controller 2242 discards the lowest-priority packet stored in the packet holding region 2243, and the process returns to step S1002 after that.

The packet controller 2242 performs the process shown in FIG. 10A for both a packet generated by the packet generator 2241, and a packet on the network obtained from the network adaptor 2100. By this process, a packet having higher priority is selected and stored in the packet holding region 2243.

FIG. 10B shows a process of sending a packet stored in the packet holding region 2243 to the network in accordance with the priority. In step S1007, the packet controller 2242 determines whether a packet can be output to the network adaptor 2100, and waits until the output becomes possible. If the output becomes possible, the process advances to step S1008. In step S1008, the packet controller 2242 transmits a packet having the highest priority, among packets stored in the packet holding region 2243, to the network via the network adaptor 2100. By repeating the process shown in FIG. 10B, packets having higher priorities are selectively transmitted to the network.

By the processes shown in FIGS. 10A and 10B as described above, the transmission unit 2200 of the camera adaptor 120 connected to the camera 112 (the second image capturing apparatus) can control the transmission of captured images. In particular, the transmission unit 2200 can determine whether to perform transmission to the transmission destination apparatus in accordance with the priority, for both an image captured by the camera 112 (the second image capturing apparatus), and an image captured by another camera 112 (the first image capturing apparatus).

In the above example, the transmission processor 2240 of each sensor system 110 has the packet control function implemented by the packet controller 2242 and the packet holding region 2243. However, the transmission processors 2240 of all the sensor systems 110 need not have the packet control function as described above. For example, only the transmission processors 2240 of some sensor systems 110 may also include this packet control function. Furthermore, instead of giving the packet control function like this to the transmission processor 2240, an independent apparatus having the abovementioned packet control function can be installed on the network.

The control apparatus according to this embodiment can set priority for an image captured by an image capturing apparatus. The control apparatus can also control the transfer or the storage of the captured image in accordance with this priority. An arrangement like this can reduce the image data amount while suppressing deterioration in quality of virtual viewpoint contents. In addition, even when the image data amount exceeds the transmission band, image data can be discarded in accordance with the priority. This makes it possible to prevent unintended image information missing, and obtain virtual viewpoint contents having stable quality even when an object moves. In this embodiment, virtual viewpoint contents can easily be generated regardless of the scale of an image processing system such as the number of cameras 112, and the resolution and output frame rate of a captured image.

Second Embodiment

In the second embodiment, priority is calculated by a method different from the first embodiment. In the first embodiment, the priority of an image captured by an image capturing apparatus is calculated in accordance with an evaluation value of the similarity between a viewpoint direction from the position of an object to an image capturing apparatus, and a viewpoint direction from the object position to another image capturing apparatus. In the second embodiment, the priority of an image captured by an image capturing apparatus is calculated in accordance with an evaluation value of the similarity between a viewpoint direction from the position of an object to an image capturing apparatus different from an image capturing apparatus of interest, and a viewpoint direction from the object position to another image capturing apparatus, in addition to the aforementioned evaluation value.

Figure 12:
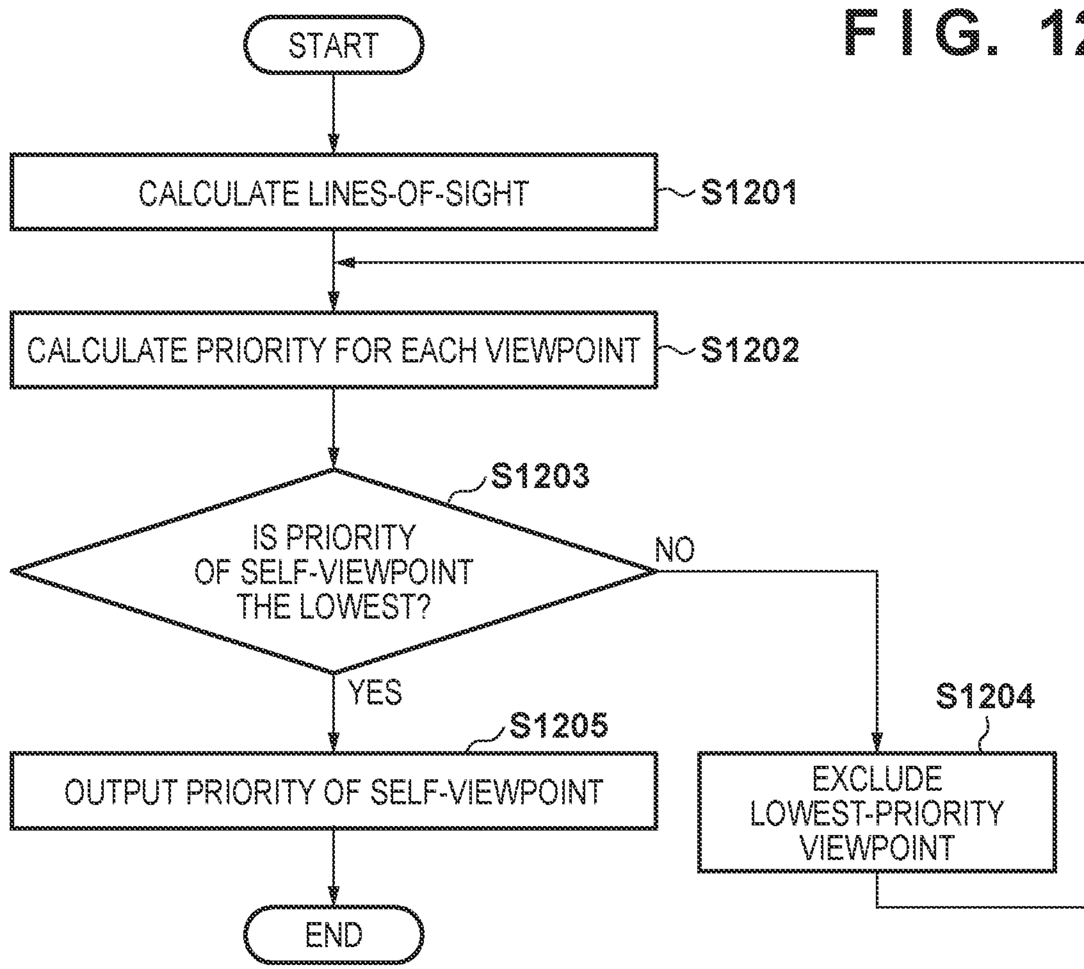
FIG. 12 is a flowchart showing an example of a priority calculation process.

The arrangement and processing of an image processing system 100 according to the second embodiment are the same as the first embodiment, but priority is calculated in accordance with a flowchart shown in FIG. 12, instead of steps S406 to S409. Processing in step S1201 is similar to that in step S407, but lines of sight from all selected viewpoints to an object position are calculated. A priority calculator 2324 can select all cameras 112 as viewpoints. As in the first embodiment, the priority calculator 2324 can also select the camera 112 containing an object within an image capturing range as a viewpoint, based on the position of the object. In processing in step S1202, the priority calculator 2324 calculates an angle made by the lines of sight of two adjacent viewpoints, as the priority, for all selected viewpoints. The calculation method is the same as in step S408.

In step S1203, the priority calculator 2324 determines whether the priority of the camera 112*a* as a priority calculation target is lowest by comparing it with the priority of each selected viewpoint. If this priority is not lowest, the process advances to step S1204. If this priority is lowest, the process advances to step S1205.

In step S1204, the priority calculator 2324 excludes a viewpoint having the lowest priority from the selected viewpoints, and the process returns to step S1202 after that. In step S1205, the priority calculator 2324 outputs the priority of the camera 112*a*. The output priority is used as the priority of the camera 112*a*.

In the second embodiment as described above, priority is calculated by further taking account of an evaluation value of the similarity between a viewpoint direction from the position of an object to the camera 112 other than the camera 112*a*, and a viewpoint direction from the object position to an adjacent viewpoint. In an arrangement like this, the priority of a camera can be calculated by taking account of the existence of another camera that has priority lower than that of the former camera and hence has a captured image that is missing more easily in the arrangement of this embodiment.

Figure 11B:
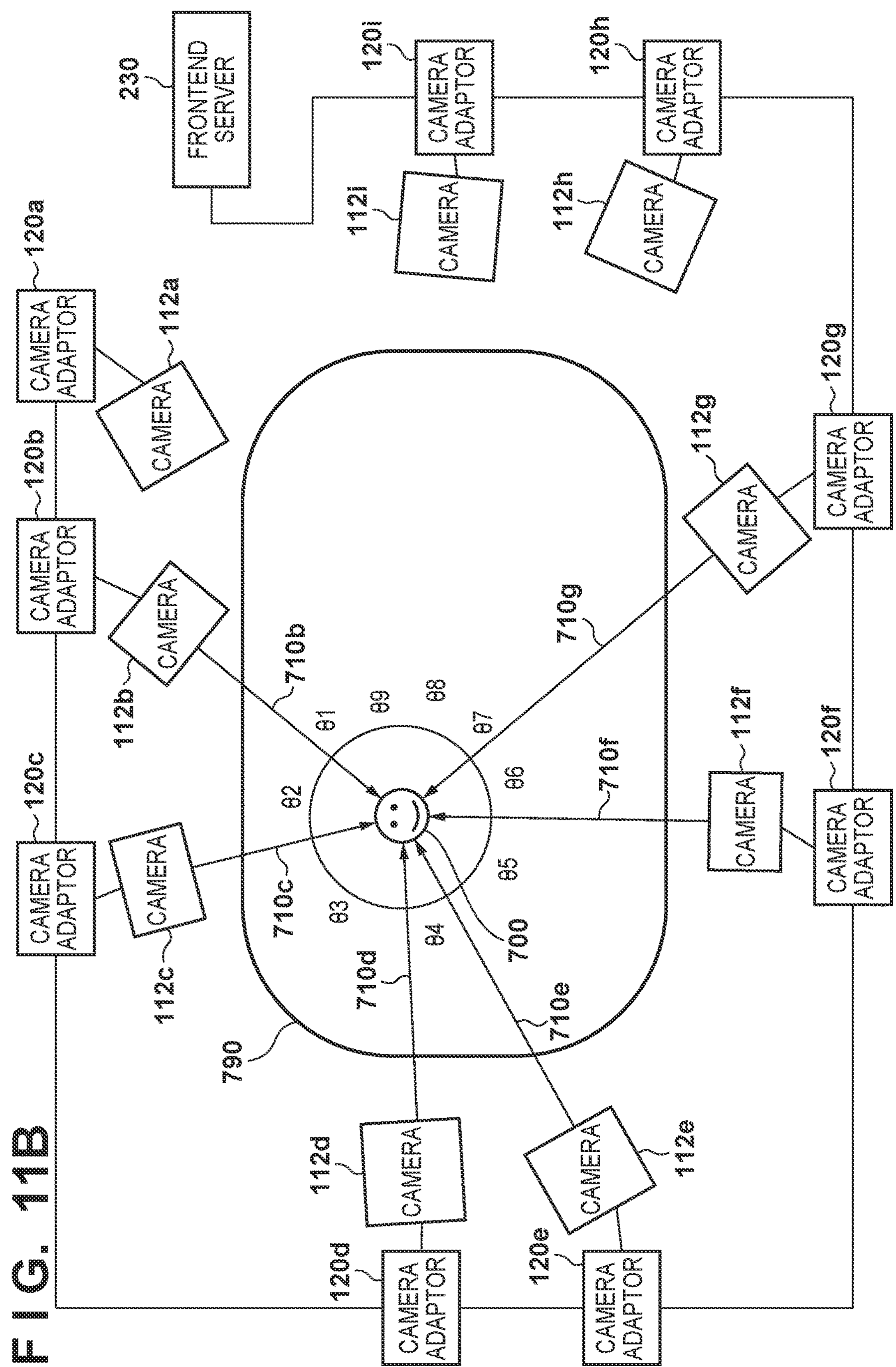

In the example shown in FIG. 7, for instance, low priorities are calculated for the cameras 112*a*, 112*h*, and 112*i* because the viewpoint directions are similar to adjacent viewpoints. In the second embodiment, however, the camera 112*h* having the lowest priority is initially excluded from the selected viewpoints, so the priorities of the cameras 112*a* and 112*i* increase. Also, when the camera 112*a* is excluded next from the selected viewpoints, the priority of the camera 112*i* becomes higher than that of the camera 112*g*. FIG. 11A shows the way captured images from three cameras having lower priorities are missing in accordance with the transmission band in this example. The deviation of the angular density on the whole circumference is smaller than that shown in FIG. 11B showing the way captured images from the cameras 112*a*, 112*h*, and 112*i* having lower priorities are missing in accordance with the first embodiment. By thus decreasing the deviation of the angular density, it is possible to increase the possibility that a missing captured image is compensated for by a captured image from an adjacent pixel, and decrease the influence of missing on a virtual viewpoint image to be generated.

Third Embodiment

In the third embodiment, a priority calculator 2324 sets priority in accordance with the position of an object for an image captured by an image capturing apparatus. This priority in accordance with the position of an object can be predetermined. The arrangement and processing of an image processing system 100 according to the third embodiment are the same as the first embodiment, but the priority calculator 2324 can set priority in accordance with the following method, instead of steps S406 to S409.

Figure 14:
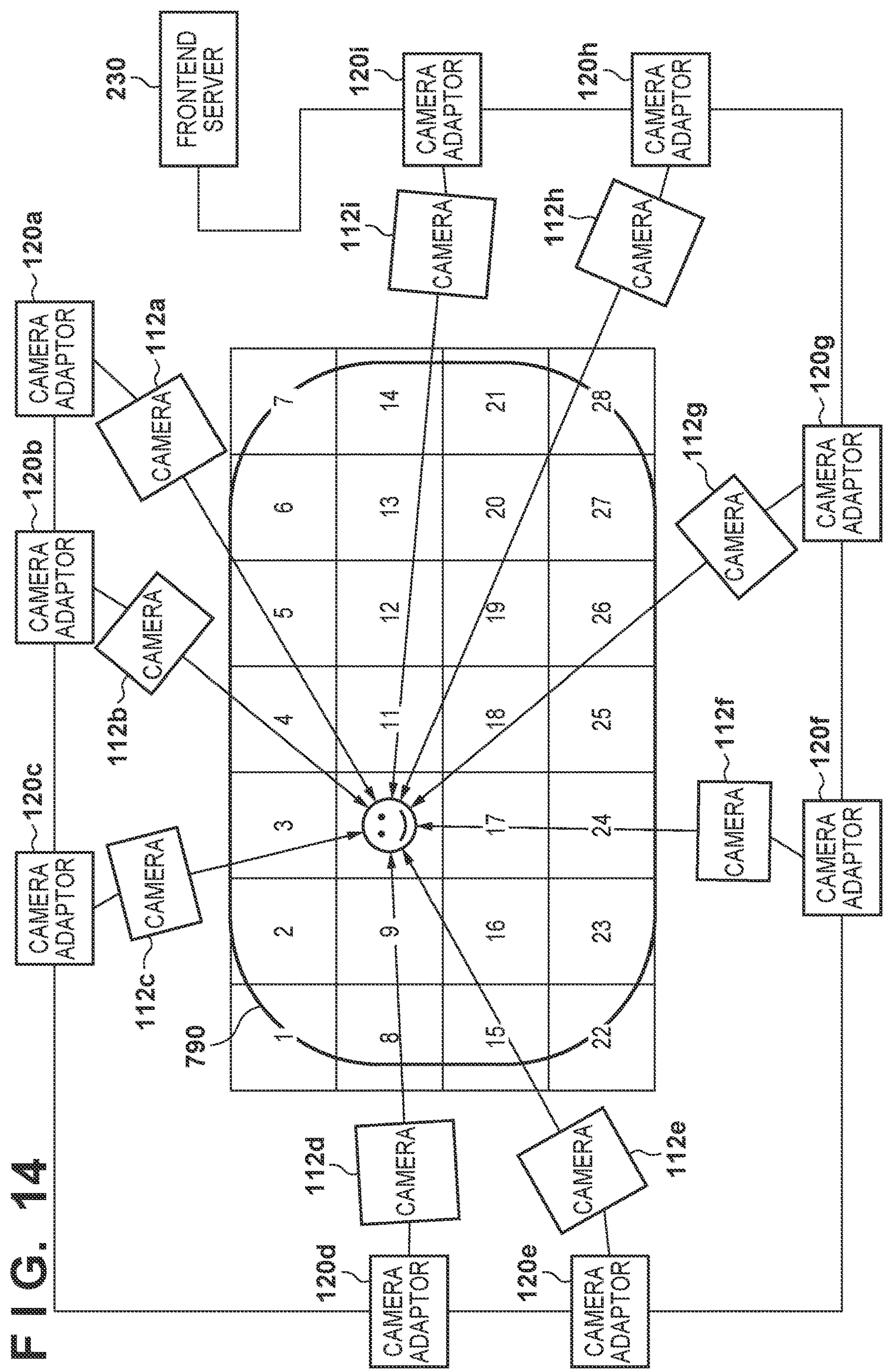
FIG. 14 is a view for explaining a method of dividing an image capturing plane into blocks.

In the third embodiment, priority corresponding to the position of an object in a field is preset. As shown in FIG. 14, a plurality of cameras 112 are so arranged as to surround a field 790 as an image capturing plane on which an object exists. The field 790 can be divided into a plurality of regions as shown in FIG. 14. In this example shown in FIG. 14, the field is divided into 4×7 blocks, and indices 1 to 28 are given to these blocks.

The priority of each of the plurality of cameras 112 with respect to each block can be set in accordance with the method of the first or second embodiment. For example, when the position of an object is the center of a block, priority calculated for each of the plurality of cameras 112 in accordance with the first or second embodiment can be set as the priority for the block. For example, an adjacent viewpoint of a camera 112*a* is selected from all viewpoints having image capturing regions containing the center of a block, and an angle made by the lines of sight of two adjacent viewpoints can be calculated as the priority of the camera 112*a* for this block. The priority like this can be calculated beforehand by a server 200 or the like based on camera parameters. Each camera adaptor 120 can obtain the priority set in this manner across the network.

In this arrangement, the priority calculator 2324 can determine a block where an object is positioned, and set a predetermined priority corresponding to the block and the camera 112 as the priority for a captured image by the camera. An arrangement like this can implement the same code amount control as in the first and second embodiments with a small processing amount. That is, the processes of calculating a viewpoint direction and an angle made of lines of sight during image capturing can be omitted by generating a priority table of each viewpoint for each block in advance. Since this reduces the processing load, image capturing can be performed at a higher frame rate.

Further Embodiments

The hardware configurations of the apparatuses constructing the image processing system will be explained in more detail below. The camera adaptor 120 may also be implemented by hardware such as an FPGA and/or an ASIC. This similarly applies to each unit of the sensor system 110, and the terminal 190, the server 200, and the controller 300. However, at least one of the apparatuses constructing the image processing system may also implement the abovementioned processing by performing software processing. That is, the above processing can be implemented by causing a processor such as a CPU, a GPU, or a DSP to operate in accordance with a program on a memory.

Figure 13:
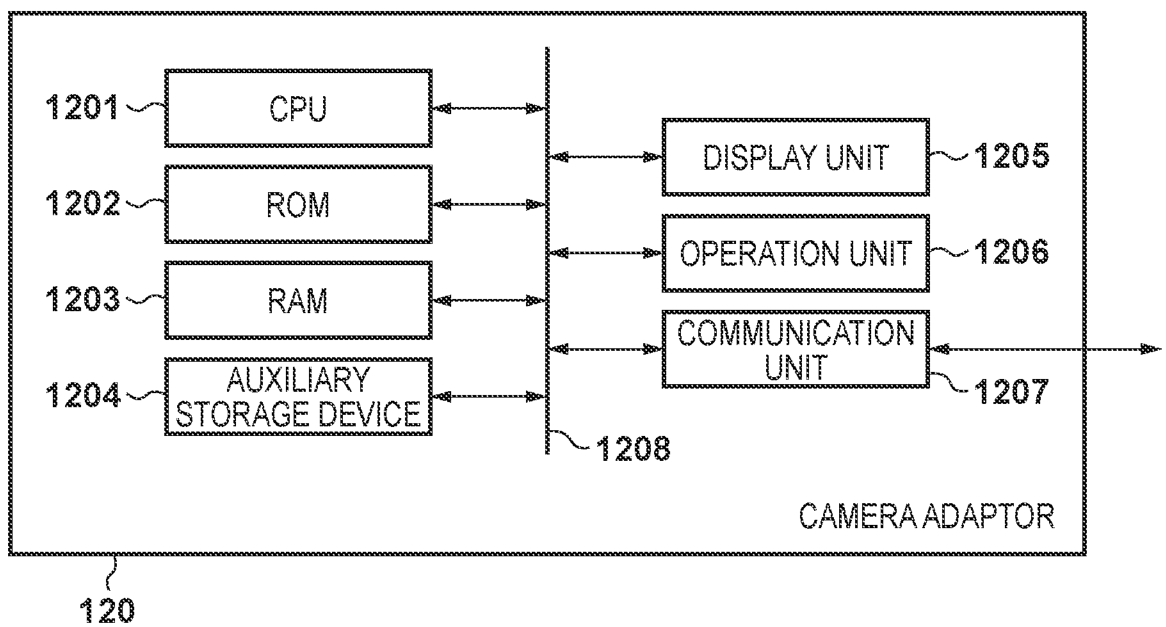
FIG. 13 is a block diagram showing a hardware configuration example of the camera adaptor 120.

FIG. 13 is a block diagram showing the hardware configuration of the camera adaptor 120 for implementing the functional configuration shown in FIG. 2 by software processing. Note that the terminal 190, the server 200, or the controller 300 may also have this hardware configuration shown in FIG. 13.

The camera adaptor 120 includes a CPU 1201, a ROM 1202, a RAM 1203, an auxiliary storage device 1204, a display unit 1205, an operation unit 1206, a communication unit 1207, and a bus 1208. The CPU 1201 is a processor, and controls the whole camera adaptor 120 by using computer programs and data stored in the ROM 1202 or the RAM 1203. The ROM 1202 is a storage medium for storing programs and data not requiring update. The RAM 1203 is a memory for temporarily storing, for example, programs and data supplied from the ROM 1202 or the auxiliary storage device 1204, and data externally supplied via the communication unit 1207. The auxiliary storage device 1204 is a storage medium capable of storing contents data such as still images and moving images, and is a hard disk drive or the like.

The display unit 1205 can display information such as a GUI (Graphical User Interface) by which the user operates the camera adaptor 120, and is a liquid crystal display or the like. The operation unit 1206 can input various instructions to the CPU 1201 in accordance with user's operations, and is a keyboard, a mouse, or the like. The communication unit 1207 can communicate with an external apparatus such as the camera 112 or the frontend server 230. For example, when the camera adaptor 120 is connected to an external apparatus by wired connection, a communication cable such as a LAN cable is connected to the communication unit 1207. When the camera adaptor 120 has a function of wirelessly communicating with an external apparatus, the communication unit 1207 includes an antenna. The bus 1208 transmits information by connecting the individual units of the camera adaptor 120.

Note that it is also possible to implement a part of the processing of each apparatus such as the camera adaptor 120 by an FPGA, and implement another partial processing by software processing using a processor. Note also that at least one of the display unit 1205 and the operation unit 1206 can exist either inside or outside the camera adaptor 120. Furthermore, the CPU 1201 can operate as a display controller for controlling the display unit 1205 existing outside the camera adaptor 120, and can also operate as an operation controller for controlling the operation unit 1206 existing outside the camera adaptor 120.

The abovementioned code amount control method is merely an example. For instance, an image processing system according to one embodiment includes a plurality of image capturing systems, like the sensor systems 110, which are connected to each other and capture images of an object from different viewpoints. A second image capturing system as at least one of the plurality of image capturing systems can receive an image captured by a first image capturing system as one of the plurality of image capturing systems. The second image capturing system can also control the transmission of its own captured image and a captured image by the first image capturing system based on the position of an object. Even an arrangement like this can reduce the image data transfer amount so as to suppress deterioration in quality of virtual viewpoint contents in accordance with the position of an object. Examples of a practical transmission control method are the methods of the first to third embodiments.

The installation place of the image processing system is not particularly limited. For example, facilities in which the image processing system can be installed are an amusement park, a public park, a racetrack, a velodrome, a casino, a swimming pool, a skating rink, a ski resort, and a live music club, in addition to a stadium and a concert hall. Also, the facilities in which the image processing system can be installed include a facility that is temporarily built (for a limited time). Furthermore, an image capturing target of the image processing system can be either an indoor event or an outdoor event.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-037771, filed Mar. 1, 2019, which is hereby incorporated by reference herein in its entirety.

What is claimed is:

1. A control apparatus of an image processing system which comprises a plurality of image capturing apparatuses that capture images of an object from different viewpoints, the control apparatus comprising:

one or more memory devices storing one or more programs; and one or more processors communicatively connected to the one or more memory devices and configured by the one or more programs at least to:

obtain a position of the object; and set, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses, wherein the priority indicates priority of transfer or storage of the captured image.

2. A control apparatus of an image processing system which comprises a plurality of image capturing apparatuses that are arranged to surround a field in which an object exists and to capture images of the object from different viewpoints, the control apparatus comprising:

one or more memory devices storing one or more programs; and one or more processors communicatively connected to the one or more memory devices and configured by the one or more programs at least to:

obtain a position of the object; and set, for a captured image by an image capturing apparatus of the plurality of image capturing apparatuses, priority in accordance with the position of the object in the field.

3. The control apparatus according to claim 1, wherein the one or more processors is or are configured by the one or more programs at least to set, for the captured image by the image capturing apparatus, priority in accordance with an evaluation value of similarity between a viewpoint direction from the position of the object to the image capturing apparatus and a viewpoint direction from the position of the object to the another image capturing apparatus.

4. The control apparatus according to claim 3, wherein the one or more processors is or are configured by the one or more programs at least to set, for the captured image by the image capturing apparatus, priority further in accordance with an evaluation value of similarity between a viewpoint direction from the position of the object to still another image capturing apparatus of the plurality of image capturing apparatuses different from the image capturing apparatus and a viewpoint direction from the position of the object to the another image capturing apparatus.

5. The control apparatus according to claim 1, wherein the one or more processors is or are configured by the one or more programs at least to:

select, from the plurality of image capturing apparatuses, an image capturing apparatus having an image capturing range within which the object exists, based on the position of the object, and set, for the captured image by the image capturing apparatus, priority in accordance with similarity between a viewpoint direction from the position of the object to the image capturing apparatus and a viewpoint direction from the object to each selected image capturing apparatus.

6. The control apparatus according to claim 1, wherein the one or more processors is or are configured by the one or more programs at least to obtain the position of the object by using a result of object extraction on the captured image.

7. The control apparatus according to claim 6, wherein the one or more processors is or are configured by the one or more programs at least to:

perform a correction process on the captured image to reduce influence of vibrations of the image capturing apparatus, and obtain the position of the object by using a captured image having undergone the correction process.

8. The control apparatus according to claim 1, wherein at least one of the plurality of image capturing apparatuses has the control apparatus.

9. The control apparatus according to claim 1, wherein a specific image capturing apparatus of the plurality of image capturing apparatuses has the control apparatus, and the one or more processors is or are configured by the one or more programs at least to set priority for the captured image by the specific image capturing apparatus which has the control apparatus.

10. The control apparatus according to claim 8, wherein the plurality of image capturing apparatuses include a first image capturing apparatus and a second image capturing apparatus, the control apparatus is connected to the second image capturing apparatus, and the one or more processors is or are configured by the one or more programs at least to receive a captured image by the first image capturing apparatus, and control transmission of the captured image by the first image capturing apparatus and a captured image by the second image capturing apparatus to a transmission destination apparatus, in accordance with priority set for each of the captured images.

11. The control apparatus according to claim 10, wherein one or more processors is or are configured by the one or more programs at least to control, in accordance with set priority, whether to transmit each of the captured image by the first image capturing apparatus and the captured image by the second image capturing apparatus to the transmission destination apparatus.

12. An image processing system comprising:

a plurality of image capturing systems, each comprising a control apparatus according to claim 1, the plurality of image capturing systems comprising respective image capturing apparatuses configured to capture images of an object from different viewpoints; and a storage device configured to store a captured image by each of the image capturing apparatuses.

13. The image processing system according to claim 12, wherein not less than two of the plurality of image capturing systems are connected in series with the storage device.

14. The image processing system according to claim 12, wherein the image capturing apparatuses of the plurality of image capturing systems are configured to perform image capturing in a synchronized manner and to output captured images obtained by the image capturing to the storage device.

15. A control method of an image processing system which comprises a plurality of image capturing apparatuses that capture images of an object from different viewpoints, the control method comprising:

obtaining a position of the object; and setting, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses, wherein the priority indicates priority of transfer or storage of the captured image.

16. A non-transitory computer-readable medium storing a program which, when executed by a computer comprising a processor and a memory, causes the computer to perform a control method of an image processing system which comprises a plurality of image capturing apparatuses that capture images of an object from different viewpoints, the control method comprising:

obtaining a position of the object; and setting, for a captured image by an image capturing apparatus of the plurality of image capturing apparatuses, priority in accordance with similarity between a viewpoint direction from the position of the object to the image capturing apparatus and a viewpoint direction from the position of the object to another image capturing apparatus of the plurality of image capturing apparatuses, wherein the priority indicates priority of transfer or storage of the captured image.

* * * * *